United States Patent [19]

Itoh et al.

[11] Patent Number: 5,430,512
[45] Date of Patent: Jul. 4, 1995

[54] CAMERA WITH MAGNETIC RECORDING APPARATUS WHEREIN RELATIVE POSITIONS OF A MAGNETIC AND A RECORDING HEAD ARE SET WITH PRECISION

[75] Inventors: Junichi Itoh; Yoji Watanabe, both of Tokyo, Japan

[73] Assignee: Olympus Optical Co., Ltd., Tokyo, Japan

[21] Appl. No.: 125,604

[22] Filed: Sep. 23, 1993

[30] Foreign Application Priority Data

May 25, 1993 [JP] Japan .................................. 5-122788

[51] Int. Cl.⁶ .............................................. G03B 17/24
[52] U.S. Cl. ........................................ 354/106; 360/1
[58] Field of Search ................ 354/105, 106; 360/1, 360/3

[56] References Cited

U.S. PATENT DOCUMENTS

| 5,005,031 | 4/1991 | Kelbe | 354/106 |
| 5,101,225 | 3/1992 | Wash et al. | 355/40 |
| 5,103,250 | 4/1992 | Arifuku et al. | 354/106 |

FOREIGN PATENT DOCUMENTS

WO90-06536  6/1990  WIPO .

*Primary Examiner*—Howard B. Blankenship
*Attorney, Agent, or Firm*—Frishauf, Holtz, Goodman & Woodward

[57] ABSTRACT

In a camera using a film with a magnetic recording portion, two film guide members restrict displacement of the film in a direction perpendicular to the moving direction of the film, and a magnetic head magnetizes the magnetic recording portion of the film. A magnetic recording current is output to the magnetic head at a predetermined magnetic recording density D. The magnetic recording density D satisfies $$D \leq K \cdot l/(\Delta/W)$$

where $l$ is the length of each of the film guides, $\Delta$ is the difference between the width of the film the distance between the two guide members, W is the width of a recording medium of the magnetic recording portion, and K is a constant.

23 Claims, 17 Drawing Sheets

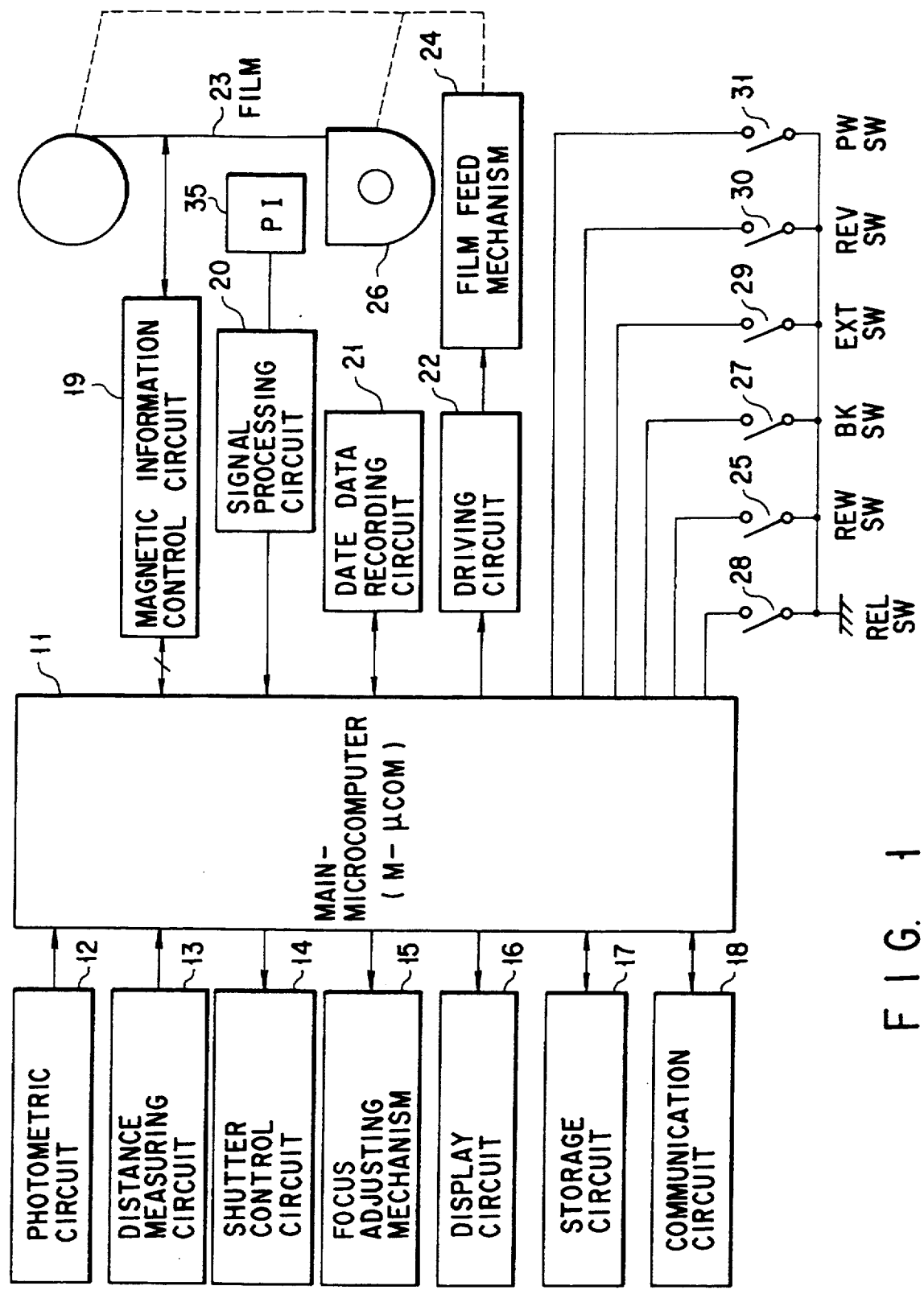
F I G. 1

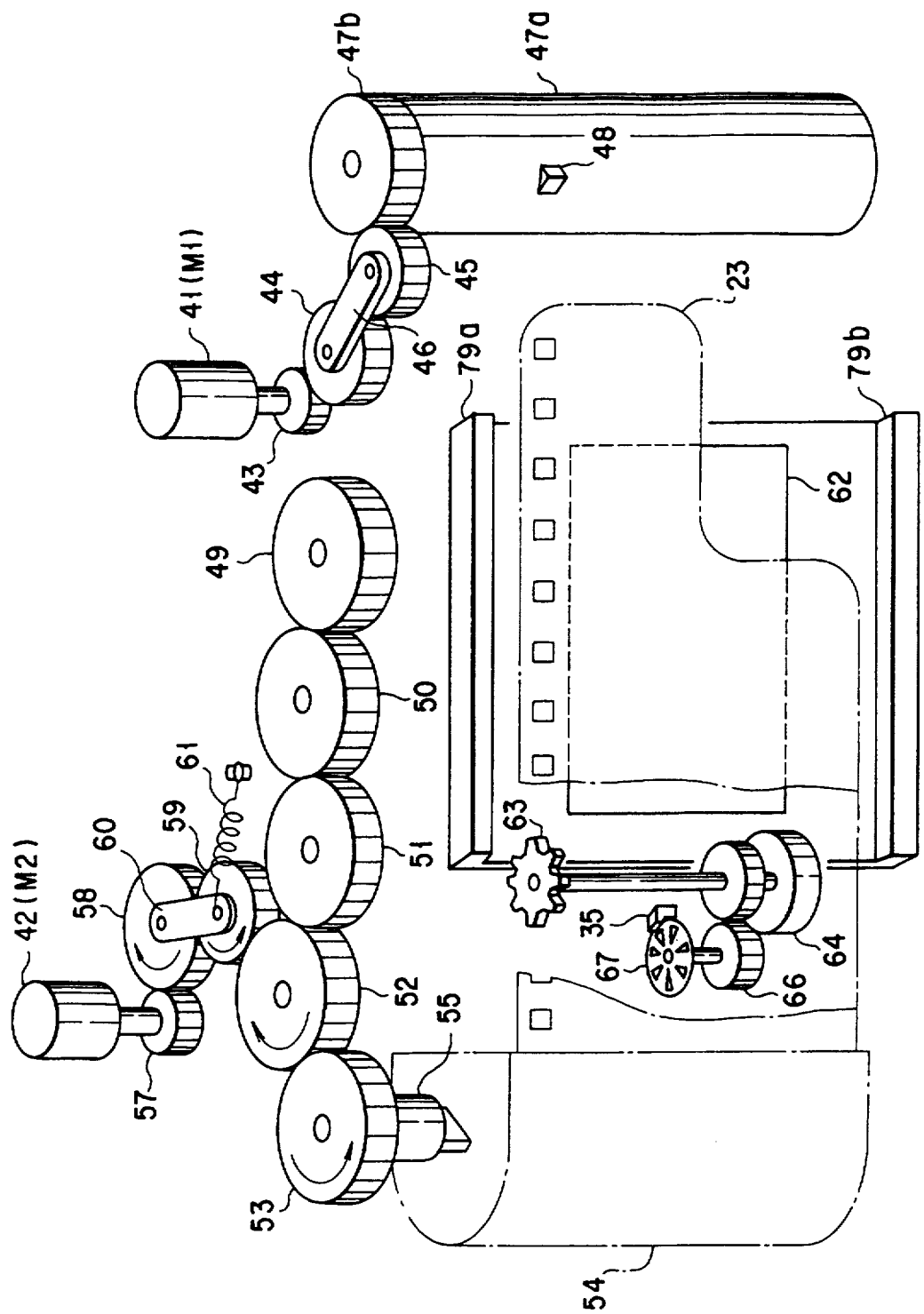
F I G. 3

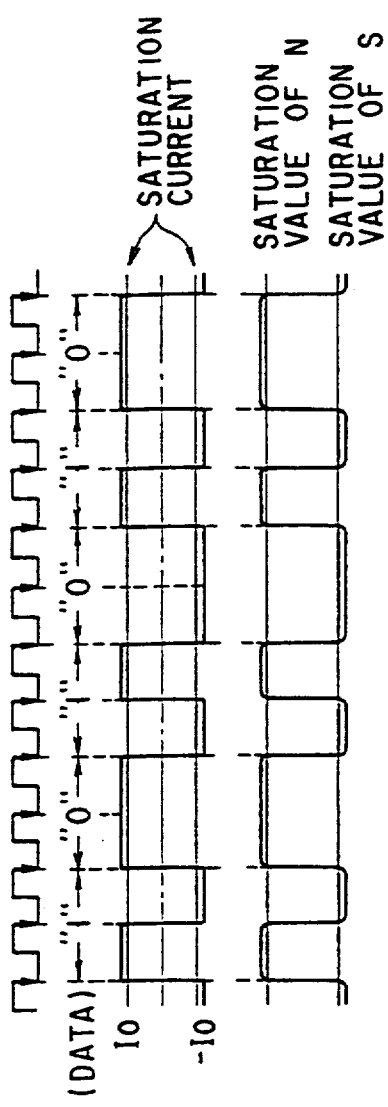
FIG. 7 (a) SYNC CLOCK
FIG. 7 (b) CURRENT IN MAGNETIC HEAD
FIG. 7 (c) STATE OF MAGNETIC TRACK
FIG. 8 (a) STATE OF MAGNETIC TRACK
FIG. 8 (b) OUTPUT FROM HEAD AMPLIFIER
FIG. 8 (c) OUTPUT FROM DIFFERENTIATING CIRCUIT
FIG. 8 (d) OUTPUT FROM COMPARATOR
FIG. 8 (e) OUTPUT FROM EDGE DETECTING CIRCUIT

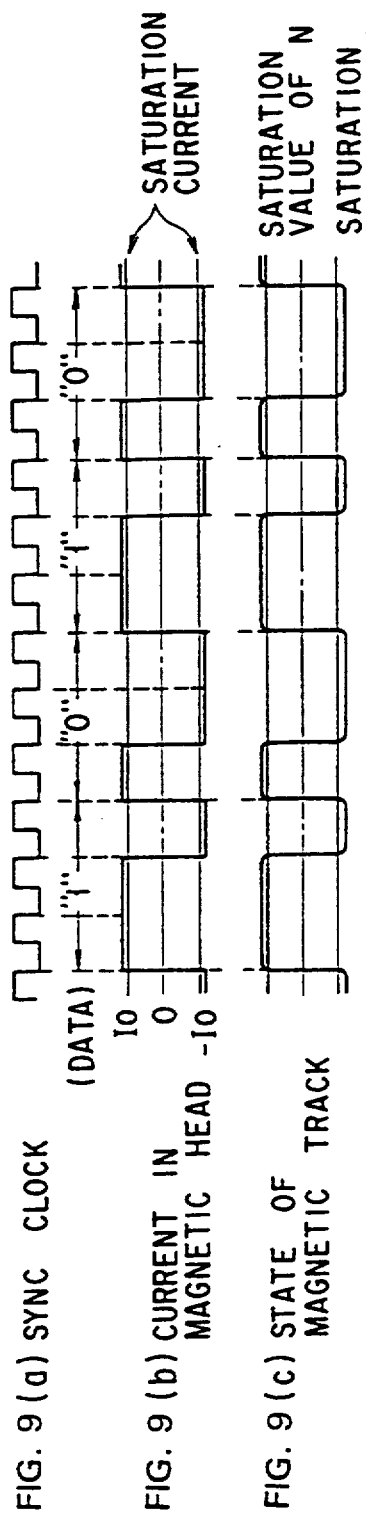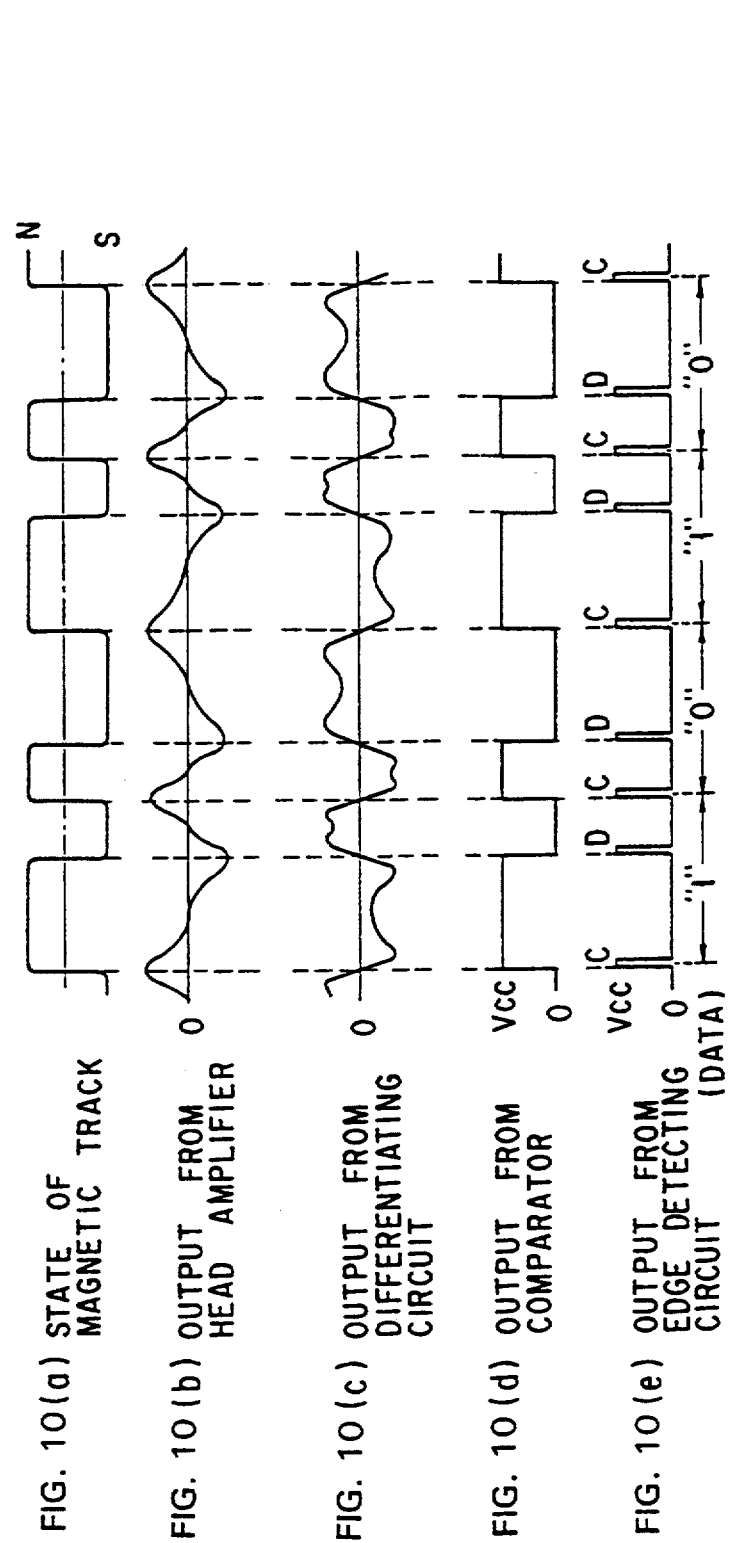
FIG. 9(a) SYNC CLOCK (DATA)
FIG. 9(b) CURRENT IN MAGNETIC HEAD
FIG. 9(c) STATE OF MAGNETIC TRACK
FIG. 10(a) STATE OF MAGNETIC TRACK
FIG. 10(b) OUTPUT FROM HEAD AMPLIFIER
FIG. 10(c) OUTPUT FROM DIFFERENTIATING CIRCUIT
FIG. 10(d) OUTPUT FROM COMPARATOR
FIG. 10(e) OUTPUT FROM EDGE DETECTING CIRCUIT (DATA)

ASCII CODE TABLE

|   | 0 | 1 | 2 | 3 | 4 | 5 | 6 | 7 |
|---|---|---|---|---|---|---|---|---|
| 0 |   |   | SPACE | 0 | @ | P | ` | p |
| 1 |   |   | ! | 1 | A | Q | a | q |
| 2 |   |   | " | 2 | B | R | b | r |
| 3 |   |   | # | 3 | C | S | c | s |
| 4 |   |   | $ | 4 | D | T | d | t |
| 5 |   |   | % | 5 | E | U | e | u |
| 6 |   |   | & | 6 | F | V | f | v |
| 7 |   |   | ' | 7 | G | W | g | w |
| 8 |   |   | ( | 8 | H | X | h | x |
| 9 |   |   | ) | 9 | I | Y | i | y |
| A |   |   | * | : | J | Z | j | z |
| B |   |   | + | ; | K | [ | k | { |
| C |   |   | , | < | L | ¥ | l | \| |
| D |   |   | - | = | M | ] | m | } |
| E |   |   | . | > | N | ^ | n | ~ |
| F |   |   | / | ? | O | _ | o |   |

FIG. 15

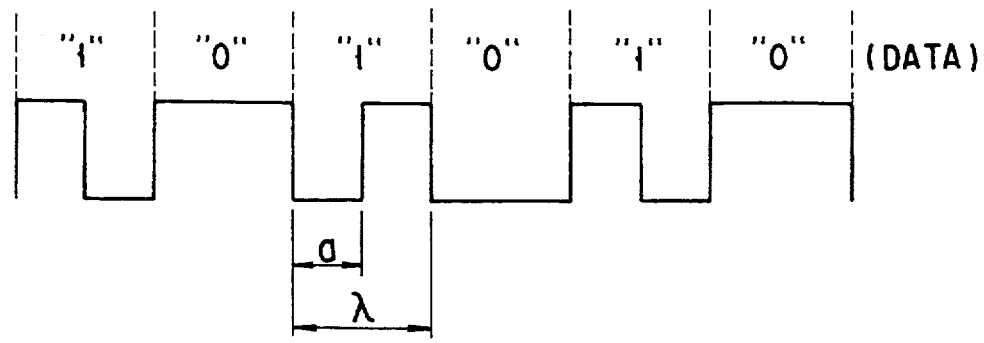
F I G. 23
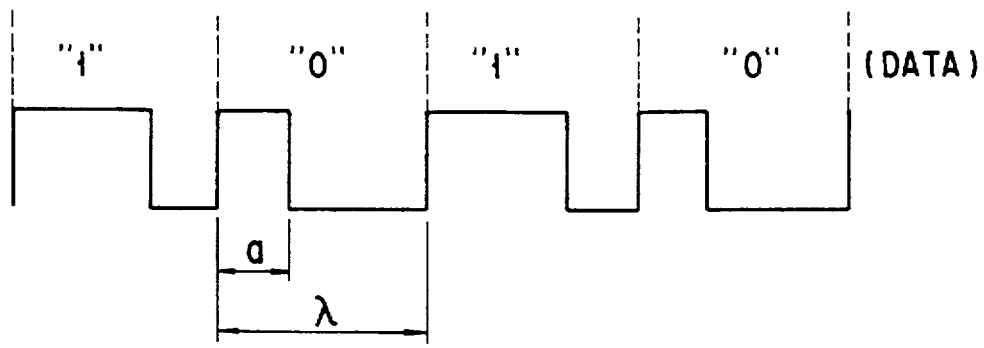
F I G. 24
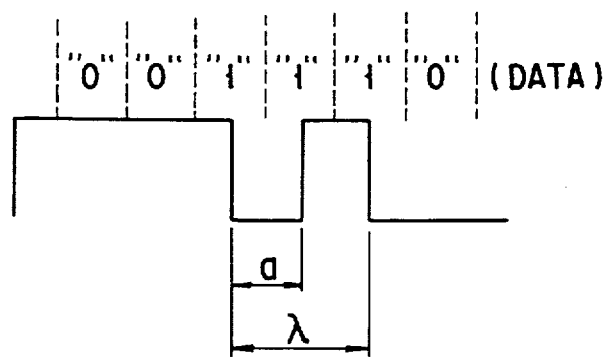
F I G. 25

CAMERA WITH MAGNETIC RECORDING APPARATUS WHEREIN RELATIVE POSITIONS OF A MAGNETIC AND A RECORDING HEAD ARE SET WITH PRECISION

BACKGROUND OF THE INVENTION

1. Field of the Invention

The present invention generally relates to a camera and, more particularly, to a magnetic recording apparatus for a camera, in which a film feed mechanism for feeding a film is improved.

2. Description of the Related Art

Cameras using films with magnetic recording media have recently been known. In a conventional camera, a technique of optically recording data, typically date data, on a film has a drawback of a small recording capacity. In contrast to this, the recording capacity of a magnetic recording medium is very large. Therefore, in a camera using a film with a magnetic recording medium, various data for photography, data for designating print conditions, and the like, which cannot be optically recorded, can be recorded.

In addition, if such a camera is designed to receive external data to be recorded from, e.g., a personal computer, the camera will have a wider range of applications.

However, the recording capacity of the magnetic recording medium of the film described above is determined by the shape of a magnetic head used, a modulation scheme, the magnetic properties of the medium, and the like. Especially in a camera, since it is difficult to position the recording medium of a film, which is caused to travel by a wind-up operation or the like, and a magnetic head with high precision, the maximum amount of data which can be recorded is limited by this positioning precision.

In order to set the position of a film with high precision with respect to the magnetic head, the camera requires a mechanism which follows variations in the state of the film. For example, such a mechanism is disclosed in International Publication No. WO90/06536. If the mechanism disclosed in this official gazette is realized and is arranged in a camera, the size and cost of the camera inevitably increase. Hence, the use of such a mechanism is not practical. It is, however, apparent that if the positional precision of a film with respect to the magnetic head is higher than a predetermined value, a practically sufficient amount of data can be recorded without arranging the mechanism disclosed in the gazette.

In conventional cameras, however, no methods of achieving such high precision of a film with respect to the magnetic head have been clarified.

SUMMARY OF THE INVENTION

It is, therefore, an object of the present invention to provide a magnetic recording apparatus for a camera in which the relative positions of a film and a head are set with required precision with respect to a desired recording capacity, and data can be reliably recorded/reproduced.

According to an aspect of the present invention, a camera is capable of loading a film having a magnetic recording medium formed in a longitudinal direction. The camera comprises: film guide means for restricting widthwise displacement of the film; and magnetic recording means, including a magnetic head which is brought into contact with the magnetic recording medium, for recording binary data on the magnetic recording medium through said magnetic head by a predetermined recording scheme. A margin of a width of said guide means with respect to a width of the film, a length L of said film guide means along which the film travels, a width W of the magnetic recording medium, and a recording density D at which the binary data is to be recorded satisfy $$D \leq K \cdot L / (\Delta \cdot W)$$

where K is a constant determined in consideration of the recording scheme and reproduction characteristics required for reproduction of the magnetically recorded information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing the arrangement of a camera as the first embodiment of the present invention;

FIG. 3 is a perspective view showing the arrangement of the magnetic recording apparatus for the camera of the first embodiment shown in FIG. 1;

FIGS. 7(a)–7(c) are timing charts in a case wherein data is recorded by an FM modulation scheme;

FIGS. 8(a)–8(e) are timing charts in a case wherein the data recorded by the FM modulation scheme is reproduced from a magnetic track;

FIGS. 9(a)–9(c) are timing charts in a case wherein data is recorded by the magnetic recording apparatus for the camera of the embodiment according to a TRI-BIT-CODE modulation scheme;

FIGS. 10(a)–10(e) are timing charts in a case wherein the data recorded by the magnetic recording apparatus for the camera of the embodiment according to the TRI-BIT-CODE modulation scheme is reproduced from a magnetic track;

FIG. 15 is a data code table used for communication between the PC and the M-μCOM in the embodiment;

FIG. 23 is a view showing an example of data modulated by an FM modulation scheme;

FIG. 24 is a view showing an example of data modulated by the TRI-BIT-CODE modulation scheme; and FIG. 25 is a view showing an example of data modulated by an NRZ1 modulation scheme.

DETAILED DESCRIPTION OF THE PREFERRED EMBODIMENTS

Figure 2:
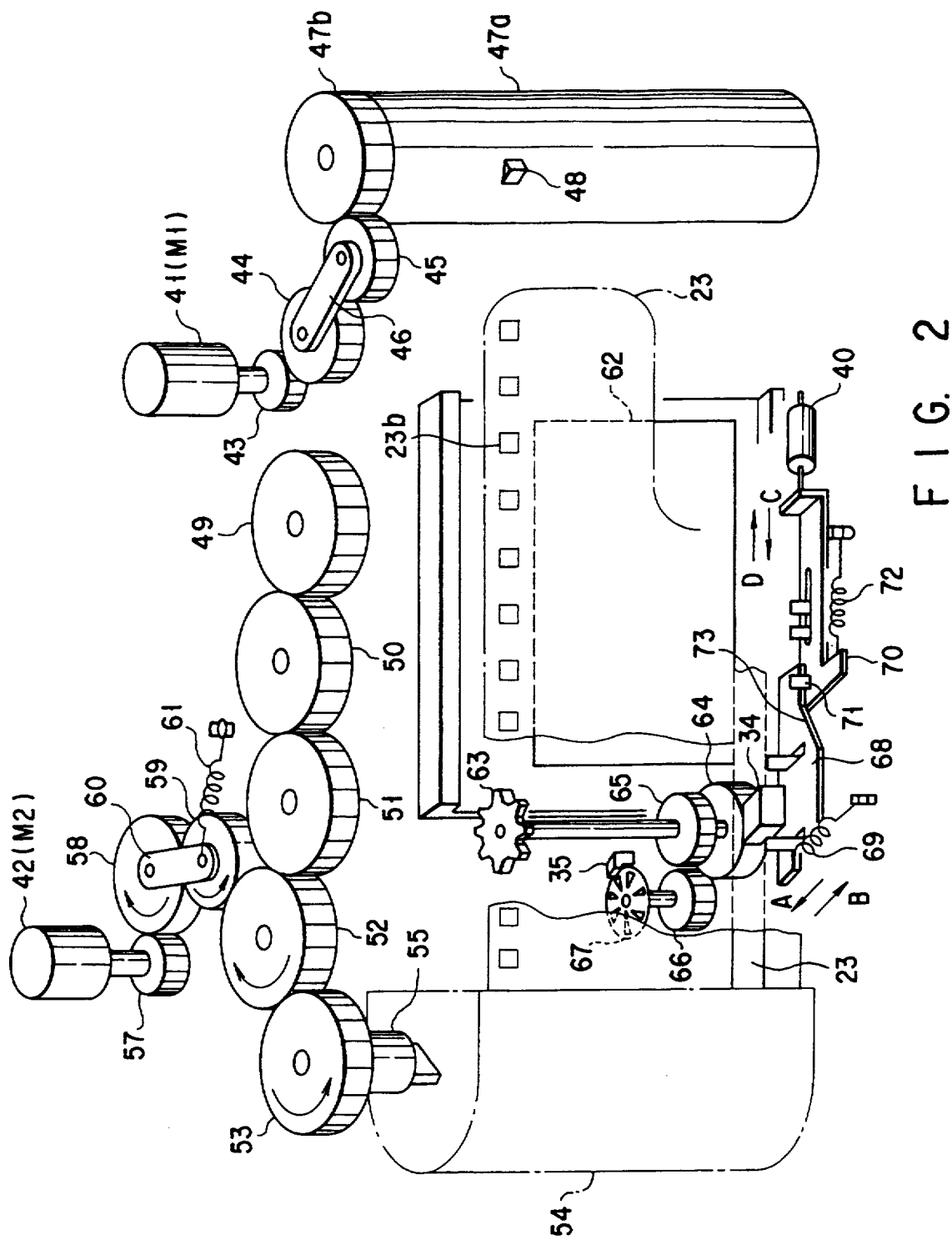
FIG. 2 is a perspective view showing the arrangement of a magnetic recording apparatus (a film feed mechanism and its peripheral portions) for the camera of the first embodiment shown in FIG. 1.

Reference will now be made in detail to the presently preferred embodiments of the invention as illustrated in the accompanying drawings, in which like reference characters designate like or corresponding parts throughout the several drawings, As the basis of the present invention, a manner of maintaining the positional precision of a film with respect to a magnetic head at a required precision will be described below.

The relationship between the positional precision of a film with respect to the magnetic head and the density of data which can be recorded will be described first.

Figure 20:
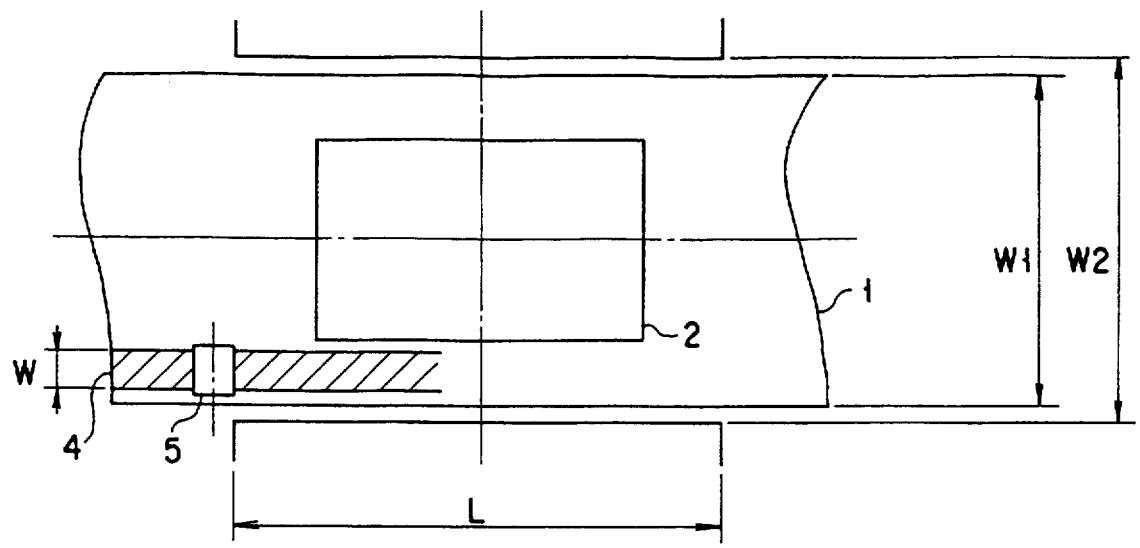
FIG. 20 is a view for explaining the relationship between a film, an opening portion, and film guides, as the basis of the present invention.

As shown in FIG. 20, film guides 3a and 3b for restricting the widthwise movement of a film 1 having a film width W1 are arranged above and below an opening portion 2 through which the film 1 is exposed. Let L be the length of each guide, and W2 be the distance between the guides 3a and 3b.

Figure 21:
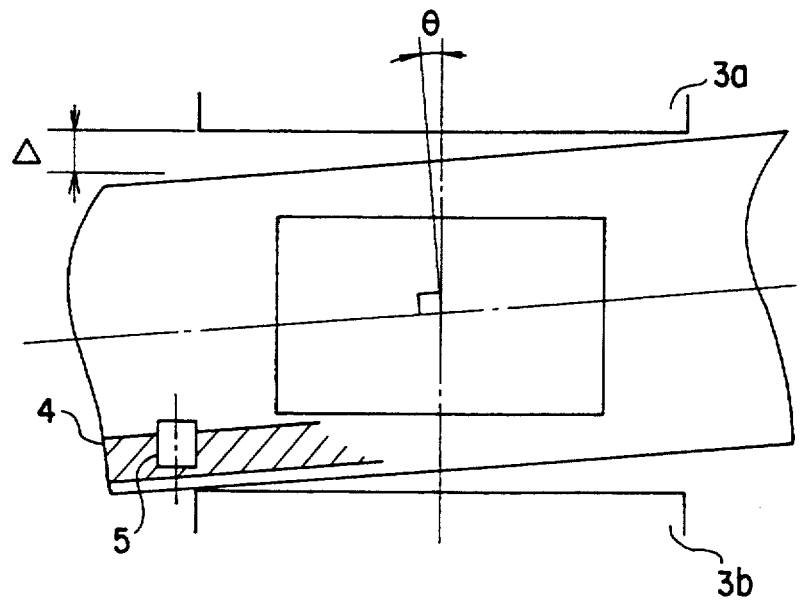
FIG. 21 is a view showing an arrangement in which the film has a tilt angle i with respect to the film guides.

The width of a general 35-mm film is defined to be W1=35.00 (−0.1 to +0) mm by the JIS standards. In general, for smooth movement of a film, a gap Δ (=W2−W1) is provided, as a margin, between the guides and the film. With this gap Δ, the film may tilt at an angle θ, as shown in FIG. 21. This tilt angle θ is defined as:

$$\theta = \frac{\Delta}{L} \text{ (rad)} \quad (1)$$

If, therefore, the gap in a reproducing operation involves an azimuth error corresponding to the tilt angle θ in the direction of track width with respect to the gap in a recording operation, the resultant reproduced signal is attenuated according to the following equation:

$$La = -20\log_{10}\left|\frac{\sin(\pi W\theta/\lambda)}{\pi W\theta/\lambda}\right| dB \quad (2)$$

where λ is the recording wavelength, and W is the width of a magnetic track.

When a magnetic material is coated on the film 1 in the form of a stripe, as shown in FIG. 21, the width W of a magnetic track 4 is the width of a magnetic recording medium. In contrast to this, if a magnetic material is coated on the entire lower surface of a film, the width of a magnetic recording medium is determined by the size of a magnetic head 5. The width W of the magnetic track 4 must be specified in consideration of compatibility of data with respect to camera systems, film development/print systems, and the like.

In order to properly reproduce a data signal recorded as a digital signal, signal reproduction must be performed up to the third to fifth harmonic components.

Figure 22:
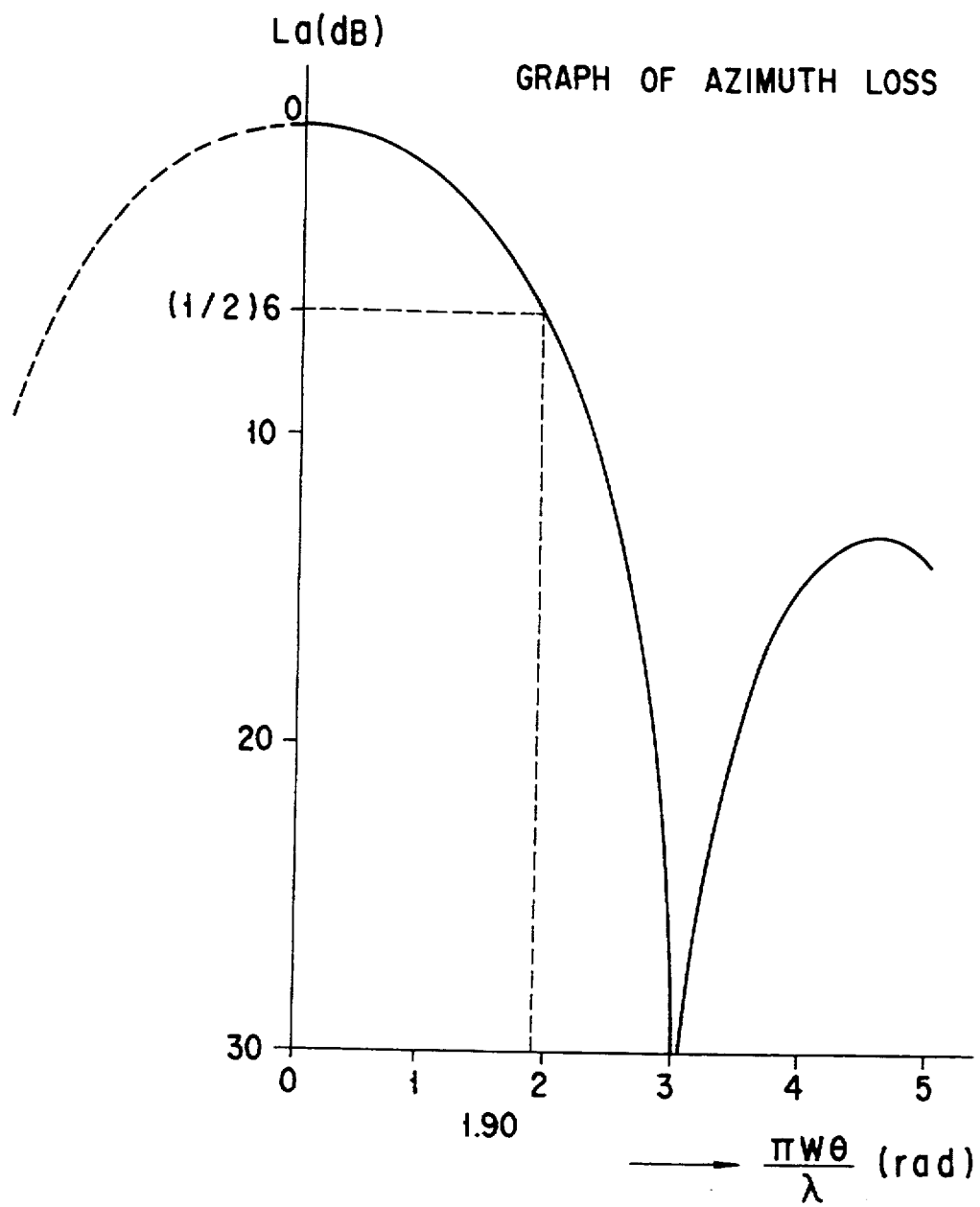
FIG. 22 is a graph showing azimuth loss characteristics.

As shown in FIG. 23, in FM modulation, one bit data is formed in an interval twice a minimum magnetization inversion interval a. Therefore, the recording wavelength in FM modulation is defined as λ=za. Assume that no practical problems are posed if signal reproduction is performed up to 1/5 (fifth order) the recording wavelength, and that the azimuth loss at 1/5 the recording wavelength is allowed up to 6 dB (½ the output). The graph shown in FIG. 22 represents equation (2). As is apparent from this graph, since the point, on the abscissa, corresponding to the point of 6 dB on the ordinate reads 1.90, $$1.9 = \frac{\pi \cdot W \cdot \theta}{\lambda} \quad (2')$$

Furthermore, if equation (2') is developed for i upon substitution of λ/5 for λ, the following equation is established:

$$\theta = 0.12 \cdot \frac{\lambda}{W} \text{ (rad)} \quad (3)$$

With equations (1) and (2), equation (3) can be modified into $$\frac{1}{\lambda} = 0.12 \frac{L}{\Delta \cdot W}$$

The data recording density is 1/λ. Therefore, a recording density DFM is defined as $$D_{FM} = 0.12 \cdot \frac{L}{\Delta \cdot W} \text{ bit/mm} \quad (4)$$

That is, the maximum recording density is determined by the gap Δ, the length L of each guide, and the width of the magnetic track. A large amount of data of a recording density exceeding the recording density DFM cannot be recorded. Equation (4) is based on an ideal state of the head in a reproducing operation (i.e., the tilt angle i defined by the gap of the head and the direction of track width is "0"). When both recording and reproduction of data are to be performed by the same camera, the maximum recording density is ½ the value obtained by equation (4). Therefore, $$D_{FM} = 0.06 \cdot \frac{L}{\Delta \cdot W} \text{ bit/mm} \tag{5}$$

The same applies to the TRI-BIT-CODE modulation scheme shown in FIG. 24. In the TRI-BIT-CODE modulation scheme, one bit data is formed in an interval three times the minimum magnetization inversion interval a. Therefore, the recording wavelength is defined as $\lambda = 3a$. That is, the maximum recording density in the TRI-BIT-CODE modulation scheme can be obtained by multiplying the recording density obtained by equation (4) by $\frac{2}{3}$. Therefore, $$D_{TRI} = 0.08 \cdot \frac{L}{\Delta \cdot W} \text{ bit/mm} \tag{6}$$

When recording and reproducing operations are performed by the same camera, the recording density is $\frac{1}{2}$ that obtained by equation (6). Hence, $$D_{TRI} = 0.04 \cdot \frac{L}{\Delta \cdot W} \text{ bit/mm} \tag{7}$$

The recording scheme shown in FIG. 25 is the NRZ1 (non-return-to-zero change-on-1) scheme. In the NRZ1 scheme, magnetization inversion is performed with respect to bit "1". One bit data can be formed in the minimum magnetization inversion interval a. That is, the maximum recording density in the NRZ1 scheme can be obtained by doubling the recording density obtained by equation (4). Therefore, $$D_{NRZ1} = 0.24 \cdot \frac{L}{\Delta \cdot W} \text{ bit/mm} \tag{8}$$

When recording and reproducing operations are to be performed by the same camera, the recording density is $\frac{1}{2}$ that obtained by equation (8). Hence, $$D_{NRZ1} = 0.12 \cdot \frac{L}{\Delta \cdot W} \text{ bit/mm} \tag{9}$$

When the recording densities defined by equations (4) to (9) are multiplied by the length of a film, the maximum storage capacities in the respective recording schemes are obtained.

In a digital recording scheme, bit data is simply formed by a combination of minimum magnetization inversion intervals a. The relationship between the minimum magnetization inversion interval and the values L, A, and W will be defined.

A substitution of $2a$ for $\lambda$ of equation (3) yields $$\theta = 0.24 \cdot \frac{a}{W} \text{ rad} \tag{3}'$$

According to equations (3)' and (1), the value a is defined as $$a = 4.2 \frac{\Delta \cdot W}{L} \text{ mm} \tag{10}$$

In a data reproducing operation, equation (10) is established when the tilt angle defined by the gap of the magnetic head and the direction of track width is "0". When recording and reproducing operations are to be performed by the same camera, $$a = 8.4 \frac{\Delta \cdot W}{L} \text{ mm} \tag{11}$$

With equations (4) to (11) obtained in the abovedescribed manner, the dimensional precision required for a camera can be obtained by only determining a recording density or a minimum magnetization inversion interval. In contrast to this, if the dimensional precision for a camera is determined in advance, the maximum storage capacity can be obtained. Note that the condition set when equations (4) to (11) are obtained from equation (2) (i.e., the azimuth loss at 1/5 the recording wavelength is allowed up to 6 dB in order to properly reproduce a signal recorded as a digital signal) is not fixed and may be properly changed as needed.

To express equation (4) to (9) in an equation of a generalized form, the following equation can be obtained:

$$D = K \cdot L / (\Delta \cdot W) \text{ bit/mm ps}$$

K is designed in consideration of a recording scheme, reproduction characteristics required for reproduction of magnetically recorded information, or the like.

Similarly, equations (10) and (11) can be expressed in a generalized form, as follows:

$$\underline{a} = K \cdot (\Delta \cdot W) / L \text{ mm}$$

K is designed in consideration of reproduction characteristics required for reproduction of magnetically recorded information.

Assume that data is to be recorded at a density of 10 bit/mm in FM modulation. In this case, if only a data recording operation is to be performed by a camera, equation (4) may be used. Therefore, any camera with values L, Δ, and W that satisfy the following relation can be used:

$$10 \leq 0.12 \cdot \frac{L}{\Delta \cdot W}$$

For example, this condition is satisfied by L=50 mm, Δ=0.5 mm, and W=1.2 mm. The values A and W may be fixed to set the value L to be larger than 50 mm.

In this case, data can be recorded at a recording density higher than 10 bit/mm, the initially intended recording density. That is a good tendency, and hence no problems are posed. Even if the calculated value L and W are fixed, and the value is set to be smaller than 0.5 mm, the recording density also increases. The same applies to a case wherein the value W is changed. In any case, the values L, Δ, and W determined by equation (4) may be considered as limit values for the design of a camera.

Consider another aspect of equation (4), i.e., a case wherein L=50 mm, Δ=0.5 mm, and W=1.2 mm are determined in terms of design. In this case, the recording density limit is 10 bit/mm. Therefore, data can be recorded at any recording density as long as it is equal to or smaller than 10 bit/mm. That is, equation (4) indicates that data should not be recorded at a recording density exceeding 10 bit/mm because the reliability of data reproduction is degraded.

Embodiments of the present invention based on the above-described principle will be described in detail next with reference to the accompanying drawings.

FIG. 1 shows the arrangement of a camera according to the first embodiment of the present invention.

In this camera, the overall control of the camera is performed by a main microcomputer (to be referred to as an M-μCOM hereinafter) 11. The following known components are connected to the M-μCOM 11: a photometric circuit 12, a distance measuring circuit 13, a shutter control mechanism 14, a focus adjusting mechanism 15, a display circuit 16, a storage circuit 17, and a communication circuit 18. The display circuit 16 displays various types of data, e.g., photographic data and date data. The storage circuit 17 is constituted by a nonvolatile memory such as an EEPROM and stores photographic frame count data, adjustment data for the camera, and the like.

The communication circuit 18 serves to input control signals supplied from the outside of the camera, The communication circuit 18 serves to input control signals supplied from the outside of the camera, data formed outside the camera, and the like. A serial communication line of a personal computer (to be referred to as a PC hereinafter) can be connected to the communication circuit 18. A magnetic information control circuit 19 performs data recording and reproducing operations in accordance with commands from the M-μCOM 11. A photointerrupter (to be referred to as a PI hereinafter) 35 serves to detect the moving amount and speed of a film 23. An output signal from the PI 35 is converted into a pulse signal by a signal processing circuit 20. The M-μCOM 11 detects the moving amount and speed of the film 23 in accordance with this pulse signal from the signal processing circuit 20.

In accordance with a control signal from the M-μCOM 11, a driving circuit 22 drives motors M1 and M2 incorporated in a film feed mechanism 24 for feeding the film 23. A date data recording circuit 21 is a known circuit for forming date data and optically recording the data on the film 23.

A plurality of switches 25 and 27 to 31 are connected to the M-μCOM 11. A rewind switch (REWSW) 25 is a switch to be operated to rewind the film 23 into a film cartridge 26 when a photographic operation is completed with respect to the film 23. A rear cover switch (BKSW) 27 is a switch which is turned on when the rear cover (not shown) of the camera main body is opened. Upon detection of a change in the state of the BKSW 27 (from an ON state to an OFF state), the M-μCOM 11 determines that the film cartridge 26 is loaded at a predetermined position in the camera main body. A release switch (RELSW) 28 is a switch to be operated to start an exposure operation. When an external control permission switch (EXTSW) 29 is turned on, communication with a PC can be performed. A data reproduction switch (REVSW) 30 is operated to reproduce data from the film 23, which data has been recorded on a magnetic track upon completion of a photographic operation. A power switch (PWSW) 31 is interlocked with the power supply of the camera.

Figure 4:
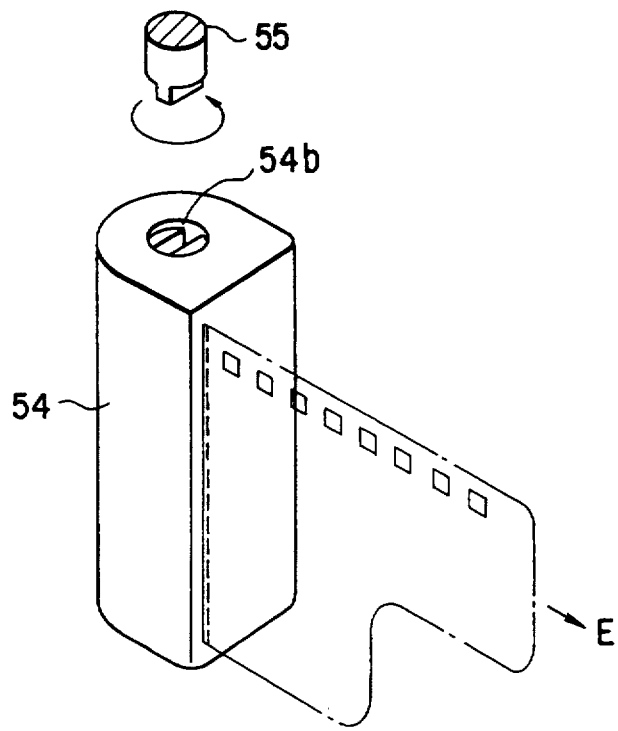
FIG. 4 is a perspective view showing a film cartridge used for the magnetic recording apparatus for the camera shown in FIG. 2.

The magnetic recording apparatus (the film feed mechanism and its peripheral portions) for the camera according to the first embodiment will be described in more detail below with reference to FIGS. 2 and 3. FIG. 4 is a perspective view showing a film cartridge used for the magnetic recording apparatus shown in FIG. 2.

Referring to FIGS. 2 and 3, a pinion gear 43 is mounted on the output shaft of a film wind/rewind motor (M1) 41 arranged in the camera main body (not shown). The pinion gear 43 is meshed with a sun gear 44. The sun gear 44 is meshed with a planetary gear 45. The planetary gear 45 is held through a gear arm 46 so as to revolve around the axis of rotation of the sun gear 44.

A take-up spool 47a for taking up a film is rotatably arranged in a film take-up chamber (not shown) formed on the right side of the camera main body when viewed from its rear side. A spool gear 47b is integrally formed on the upper end face of the take-up spool 47a. The spool gear 47b is meshed with the planetary gear 45 when it revolves counterclockwise. In addition, a lock pawl 48 extends from the take-up spool 47a so as to be engaged with each of perforations 23b (to be described later) of the film 23.

An idle gear 49 is disposed at a position where it is meshed with the planetary gear 45 when the planetary gear 45 revolves clockwise. In this case, as shown in FIGS. 2 and 3, the planetary gear 45 is coupled to a coupler gear 53 (to be described later) through the idle gear 49 and idle gears 50, 51, and 52.

A film cartridge housing chamber for housing a film cartridge 54 is formed on the left side of the camera main body when viewed from its rear side. A coupler gear 53 having a coupler 55 is rotatably arranged above the film cartridge 54. The coupler 55 has a distal end extended in the form of a minus sign (−). As shown in FIG. 4, the coupler 55 is engaged with a spool groove 54b formed in the upper end face of the film cartridge 54 so as to be integrally rotated with the spool groove 54b about an axis.

A film feed motor (M2) 42 is also arranged in the camera main body. A pinion gear 57 is mounted on the output shaft of the film feed motor 42. The pinion gear 57 is meshed with a sun gear 58. A planetary gear 59 is meshed with the sun gear 58 and is also supported through a gear arm 60 so as to revolve around the axis of rotation of the sun gear 58. Since the tension of a spring 61 acts on the gear arm 60, the planetary gear 59 is meshed with the idle gear 52 only when the film feed motor (M2) 42 is rotated counterclockwise.

The film 23 is exposed to light through an opening portion 62 formed in the camera main body. A sprocket 63 is disposed near the opening portion 62. The sprocket 63 is meshed with the perforations 23b of the film 23 and is rotated in synchronism with the movement of the film 23.

A press roller 64 and a gear 65 are integrally mounted on the rotating shaft of the sprocket 63. The gear 65 is meshed with a gear 66. In addition, a disk 67 having slits is integrally mounted on the rotating shaft of the gear 66.

When the sprocket 63 is rotated, the disk 67 is rotated at a rotational speed which is increased by the gears 65 and 66. Every time one of the slits of the disk 67 crosses the above-described PI 35, the PI 35 outputs a signal. This signal is converted into a pulse signal by the signal processing circuit 20. The M-μCOM 11 can detect the movement of the film 23 in accordance with this pulse signal. A sync clock required for a data recording operation is generated from the pulse signal. For example, in the FM modulation scheme, two sync clocks are required to form 1-bit data (see FIGS. 7(a)–7(c)). For example, in order to record data at a recording density of 5 [bit/mm], the M-μCOM 11 must generate 10 sync signals for each film moving amount of 1 mm. It is, therefore, preferable that pulse signals be generated at the same density as that of required sync clocks by properly setting the numbers of teeth of the gears 65 and 66 and the number of slits of the disk 67. If sync clocks and pulse signals differ in generation density, required sync clocks cannot be obtained unless each pulse signal is frequency-divided or frequency-multiplied.

A magnetic head 34 is arranged at a position where it opposes the press roller 64 so as to hold the film 23 therebetween. Note that the magnetic head 34 is fixed to a board 68 which can slide in the directions indicated by arrows A and B in FIG. 2. While a solenoid 40 is not driven, the tension of a spring 69 acts on the board 68 so that the magnetic head 34 does not press the film 23.

The output shaft of the solenoid 40 is fixed to a board 70 which can slide in the directions indicated by arrows C and D in FIG. 2. A pin 71 fixed to the board 70 is located at the position shown in FIG. 2 because the tension of a spring 72 acts on the board 70. When the solenoid 40 is driven, the board 70 slides in the direction indicated by the arrow D in FIG. 2, and the pin 71 slides along a side surface 73 of the board 68. As a result, the board 68 slides in the direction indicated by the arrow A in FIG. 2 against the tension of the spring 69, and the magnetic head 34 presses the film 23.

In addition, as shown in FIG. 3, film guides 79a and 79b for restricting the widthwise displacement of a film are formed on portions, of the opening portion 62, which extend upward and downward, respectively.

These film guides 79a and 79b correspond to the film guides shown in FIG. 20. As described above, the positional precision of the film 23 with respect to the magnetic head 34 is determined by the dimensions of the film guides 79a and 79b. Therefore, these dimensions must be designed in consideration of a recording scheme, a recording density, and the like. Consider a case wherein data is to be recorded by the FM modulation scheme at a recording density (D) of 5 bit/mm, and a data reproducing operation is also performed in the camera. In this case, equation (5) may be used. Assume that a cassette head is used as a magnetic head. Since the rated width of the head is 1.5 mm, W=1.5. The length of each film guide is determined by the size of the camera body. Assume that L=80 mm. Substitutions of 5, 1.5, and 80 for D, W, and L of equation (5) yield $\Delta=0.6$ mm. Provided that the width of the film conforms to the JIS standards (35.00 to 34.90 mm), the distance between the film guides 79a and 79b is 35.5 mm. This value is the maximum value. Unless the movement of the film 23 is obstructed, the distance between the film guides 79a and 79b can be set to be smaller than the maximum value without causing any problem.

Figure 5:
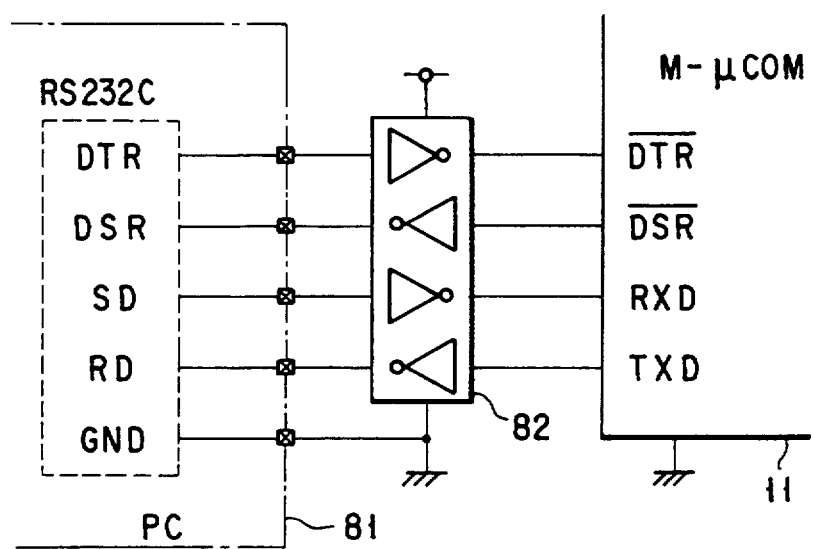
FIG. 5 is a block diagram showing an arrangement of a communication circuit of the camera of the embodiment.

An arrangement of the communication circuit 18 of the camera according to the embodiment will be described below with reference to FIG. 5. A known RS232C port is arranged, as a standard component, in a personal computer (to be referred to as a PC hereinafter) 81. Communication between the PC 81 and the M-μCOM 11 can be performed by using four signal lines DTR, DSR, SD, and RD of the RS232C. The PC 81 transfers data to the M-μCOM 11 through the signal line SD. This data is input through a serial data reception port RXD of the M-μCOM 11. The M-μCOM 11 transfers data to the PC 81 through the signal line RD. This data is output from a serial data port TXD of the M-μCOM 11. A serial communication scheme is an asynchronous communication scheme which requires no sync clocks. The signal lines DTR and DSR are control lines used to synchronize data transmission and reception. Since the signal level based on the RS232C standards is different from the signal level of the M-μCOM 11, a level converter 82 is required to match these signal levels with each other.

Figure 6:
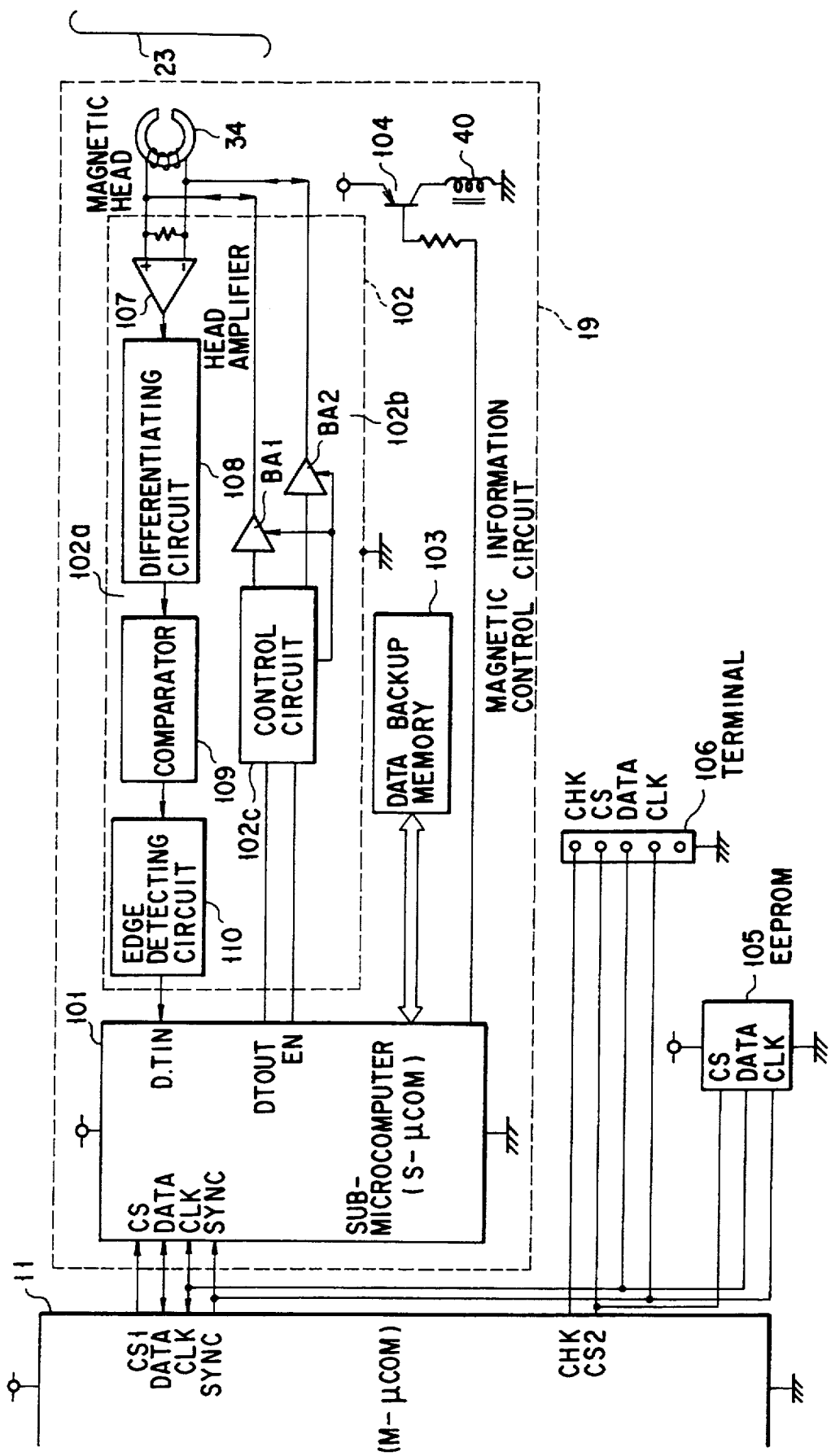
FIG. 6 is a block diagram showing an arrangement of a magnetic information control circuit of the camera of the embodiment.

FIG. 6 shows the arrangement of the magnetic information control circuit 19 of the camera of the embodiment. The arrangement and operation of the magnetic information control circuit 19 will be described below with reference to FIG. 6.

In the magnetic information control circuit 19, a sub-microcomputer (to be referred to as a S-μCOM hereinafter) 101 executes data recording and reproducing operations in accordance with commands from the M-μCOM 11. Ports CS, DATA, and CLK are used for communications between the S-μCOM 101 and the M-μCOM 11. These communications are performed by a serial communication scheme. A port SYNC is used to send sync clocks required to record data on the magnetic track on the film 23.

In the magnetic information control circuit 19, an interface circuit 102 includes a reproducing section 102a for converting a signal output from the magnetic head 34 into a signal which can be input to the S-μCOM 101, and a recording section 102b for supplying currents to the magnetic head 34 in accordance with an output from the S-μCOM 101. A data backup memory 103 stores the data transferred from the M-μCOM 11 through the S-μCOM 101 until a recording operation is started. This memory 103 is a nonvolatile memory which retains data in the absence of power in the camera.

A transistor 104 connected to the S-μCOM 101 serves to drive the above-mentioned solenoid 40.

FIGS. 7(a)-7(c) are timing chart in a case wherein data is recorded by the FM modulation scheme. In FM modulation, 1-bit data is formed on a magnetic member by using two sync clocks input to the port SYNC. When data is "1", a current supplied to the head is inverted every time a sync clock is input. When data is "0", the direction of a current supplied to the magnetic head is reversed in response to the first sync clock. Note that no reaction occurs with respect to the second sync clock.

With this operation, the magnetic track is magnetized in the same form as the current waveform. Sync clocks are generated by the M-μCOM 11 in consideration of a recording scheme, a recording density limit, and the moving speed of a film. The recording density limit can be obtained by using one of equations (4) to (9) described above. The obtained value is stored in the storage circuit (EEPROM) 17 described above.

Currents to be supplied to the magnetic head 34 are output from buffer amplifiers BA1 and BA2 of the interface circuit 102. A control circuit 102c controls the buffer amplifiers BA1 and BA2 in accordance with the states of ports DTOUT and EN. While no current supply operation with respect to the magnetic head 34 is performed, the outputs of the buffer amplifiers BA1 and BA2 are kept at high impedance. Therefore, in a data reproducing operation, outputs from the buffer amplifiers BA1 and BA2 and a signal from the magnetic head 34 do not interfere with each other.

FIGS. 8(a)-8(e) are timing chart in a case wherein data recorded by the FM modulation is reproduced from the magnetic track.

In a data reproducing operation, when the film 23 shown in FIG. 2 travels, the magnetic head 34 generates a signal in accordance with the magnetized state of a magnetic recording medium (magnetic track) 23a of the film 23. when the magnetic head 34 passes a position where the magnetized state changes from an N pole to an S pole (or from an S pole to an N pole), the reproduced signal exhibits its peak.

In order to read the data recorded on the magnetic track 23a, the peak of this signal must be detected. The reproduced signal is amplified by a head amplifier 107 in the interface circuit 102 shown in FIG. 6. The amplified reproduced signal is input to a differentiating circuit 108. An output from the differentiating circuit 108 steeply crosses the "0" level at the position of the peak of the reproduced signal. An output from a comparator 109, which receives the output from the differentiating circuit 108, is inverted at the position where the output from the differentiating circuit 108 crosses the "0" level.

Consequently, the output from the comparator 109 becomes identical to the magnetic pattern of the magnetic track 23a. The output from the comparator 109 is also input to an edge detecting circuit 110. The edge detecting circuit 110 generates a pulse signal upon detection of a change in the level of the signal, i.e., from high level to low level or from low level to high level.

This pulse signal is output to a port D.TIN of the S-µCOM 101. The pulse signal includes clock pulses (indicated by "C" in the timing chart) for delimiting data, and data pulses (indicated by "D" in the timing chart) for discriminating "1" from "0". When a data pulse is present between clock pulses, the S-µCOM 101 determines the corresponding data as "1". If no data pulse is present in such an interval, "0" is determined.

FIGS. 9(a)-9(c) are timing chart in a case wherein data is recorded by a modulation scheme called the TRI-BIT-CODE modulation scheme. In the TRI-BIT-CODE modulation scheme, 1-bit data is formed on a magnetic member by using three sync clocks.

When data to be recorded is "1", a positive current Io is supplied to the magnetic head 34 for a time period corresponding to two clocks, and a negative current −Io is supplied to the magnetic head 34 for a time period corresponding to one clock. When data to be recorded is "0", a positive current is supplied to the magnetic head 34 for a time period corresponding to one pulse, and a negative current is supplied to the magnetic head 34 for a time period corresponding to two pulses. With this operation, the magnetic track is magnetized in the same form as the current waveform.

FIGS. 10(a)-10(e) are timing chart in a case wherein the data recorded by the TRI-BIT-CODE modulation scheme is reproduced from the magnetic track. A signal from the magnetic head 34 is converted into a pulse signal by the edge detecting circuit 110 through the head amplifier 107, the differentiating circuit 108, and the comparator 109. The pulse signal is then output to the S-µCOM 101.

This pulse signal includes clock pulses (indicated by "C") and data pulses (indicated by "D"). On the basis of the position of a data pulse between clock pulses, the S-µCOM 101 checks whether the corresponding data is "1" or "0".

The ports DATA and CLK of the M-µCOM 11 are connected to an EEPROM 105, in addition to the S-µCOM 101. The M-µCOM 11 performs communication with the EEPROM 105 by using three signals lines CS2, DATA, and CLK. A terminal 106 is arranged to allow communication with the EEPROM 105 from the outside of the camera. A port CHK of the terminal 106 is used to stop a communicating operation of the M-µCOM 11. Note that when data is to be externally read/written from/in the EEPROM 105, a communication operation of the M-µCOM 11 must be temporarily inhibited.

Figure 11:
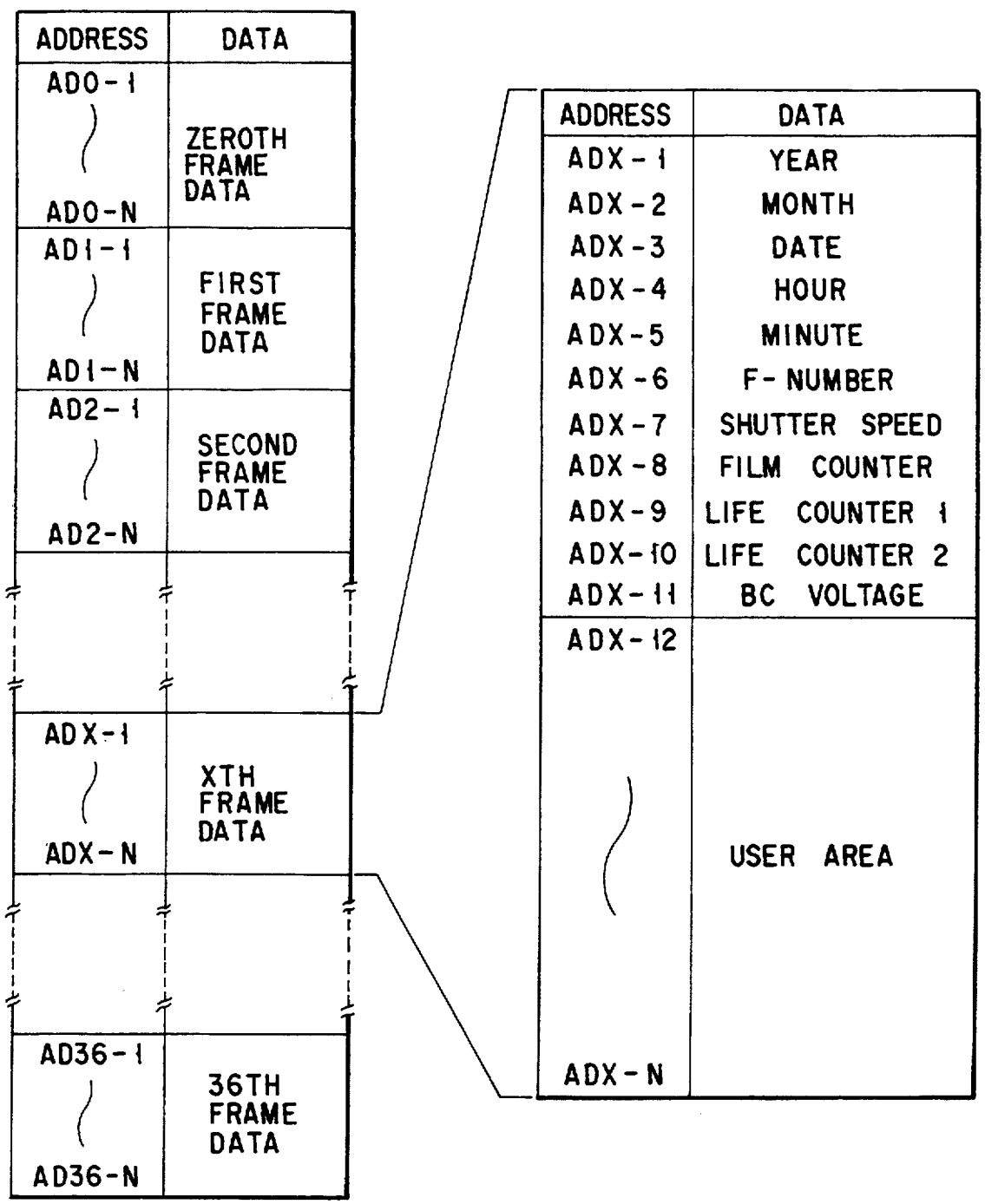
FIG. 11 is a memory map of a data backup memory used for the camera of the embodiment.

The memory map of the data backup memory 103 used for the camera of the embodiment will be described next with reference to FIG. 11.

The backup memory 103 shown in FIG. 6 is virtually divided into a plurality of areas, in each of which the data of a corresponding frame on the film 23 are stored. These data are recorded on the magnetic track 23a on the film 23 in synchronism with an operation of rewinding the film 23 into the film cartridge 54.

Of these data, data corresponding to the zeroth frame are stored at addresses AD0-1 to AD0-N. The area corresponding to the zeroth frame of a film is an area which is not exposed. In the zeroth frame, recording is allowed only with respect to the magnetic member. This area is mainly used by a film process company to manage the film after photography is completed. At addresses AD1-1 to AD-N, the photographic data of the first frame are stored.

Similarly, photographic data are stored at addresses corresponding to the respective frames. For example, the contents of the photographic data of the Xth frame, stored at addresses ADX-1 to ADX-N, are shown in an enlarged map on the right side of FIG. 11. The data ("year", "month", "date", "hour", "minute", "F-number", "shutter speed", "film counter", "life counter 1", "life counter 2", and "BC voltage") at addresses ADX-1 to ADX-11 are stored every time the camera executes a photographic operation. The area corresponding to addresses ADX-12 to ADX-N is an area which can be freely used by the user.

Figure 12:
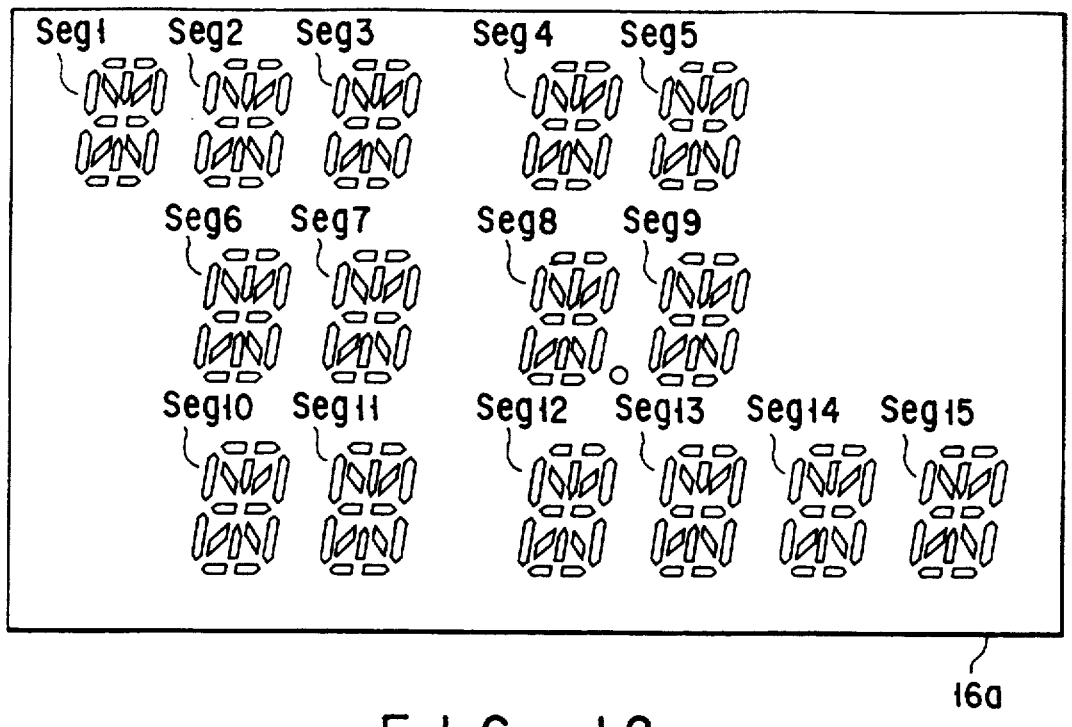
FIG. 12 is a view showing the arrangement of an LCD connected to a display circuit in FIG. 1.

FIG. 12 shows the arrangement of a display panel 16a of a liquid crystal display unit connected to the display circuit 16. The display panel 16a is constituted by display segments Seg1 to Seg15.

Figure 13:
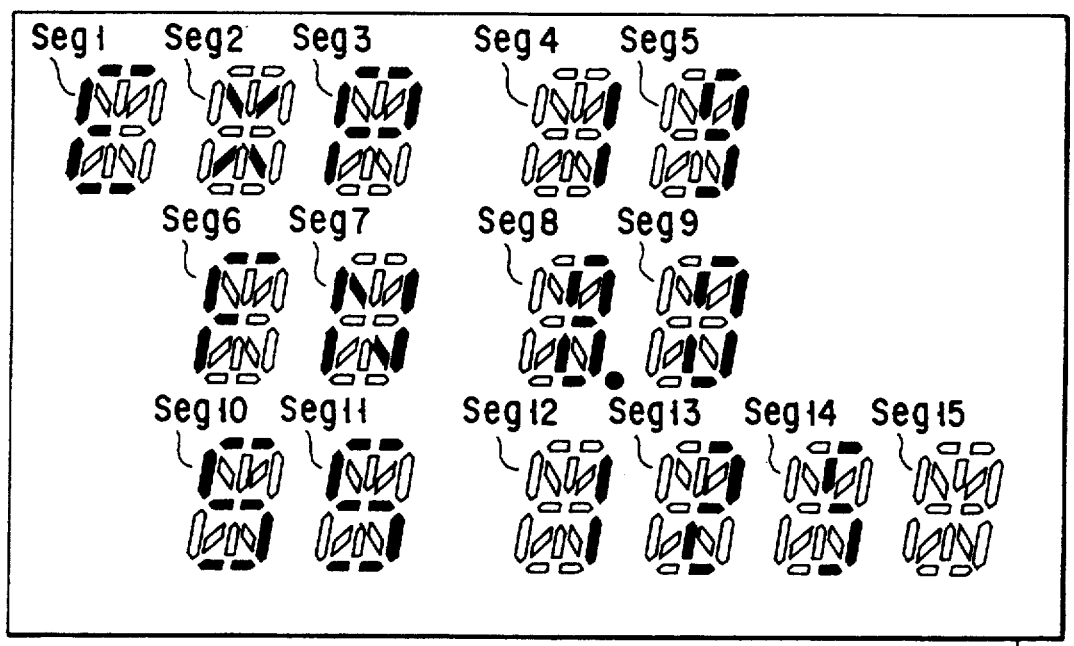
FIG. 13 is a view showing an example of a display performed by the LCD used in the embodiment.

FIG. 13 shows an example of a display using the display panel 16a, in which "EXP 19" displayed by the display segments Seg1 to Seg5 and "FN 8.0" displayed by the display segments Seg6 to Seg9 indicate that the Fnumber is FNo=8.0. "SS 125" displayed by the display segments Seg10 to Seg14 indicates that the shutter speed is 1/125 sec.

The communication protocol between the M-µCOM 11 and the PC 81 will be described next with reference to the timing charts shown in FIGS. 14A, 14B, and 14C.

When the PC 81 opens the lines of the RS232C, a signal DTR (an inverted signal of a signal DTR) from the M-µCOM 11 changes from high level to low level. Upon detecting that the signal DTR is set at low level, the M-µCOM 11 changes the level of a signal DSR (an inverted signal of a signal DSR) from high level to low level.

When the signal DSR goes to low level, the PC 81 determines that the M-µCOM 11 is set in a communicative state. Upon this determination, the PC 81 outputs command data (a, c, or c), used by the M-µCOM 11 to identify a communication mode (to be described later), to the M-µCOM 11.

In any communication mode (to be described later), therefore, the command data (a, c, or b) is located at the start position of communication data. Lastly, the M-µCOM 11 transfers an end code to the PC 81, thus terminating the communication mode. Upon reception of the end code, the PC 81 closes the lines of the RS232C. At this time, the signal DTR changes from low level to high level. Upon detection of this change, the M-μCOM 11 changes the level of the signal DSR from low level to high level, thus inhibiting a communicating operation.

Figure 14A:
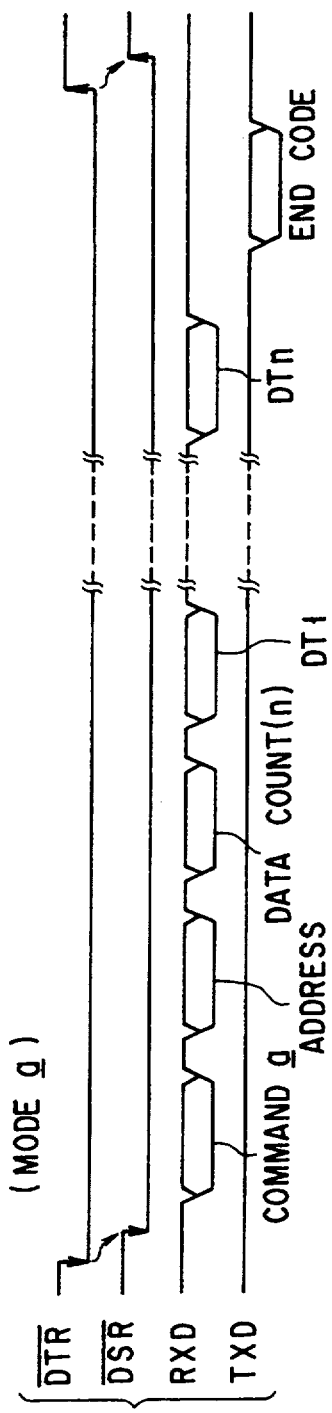
FIGS. 14A, 14B, and 14C are timing charts for explaining a communication protocol between an M-μCOM and a PC.

FIG. 14A is a timing chart in a mode a. In the mode a, the M-μCOM 11 stores data, transferred from the PC 81 through the S-μCOM 101, in the data backup memory 103 shown in FIG. 6. The PC 81 outputs address data of the backup memory 103 after the command a. Data DT1 to DTn are stored in the backup memory 103 with reference to this address data. Data count (n) data is added to facilitate a data loading operation of the M-μCOM 11. Upon storing all the data in the data backup memory 103, the M-μCOM 11 outputs an end code to the PC 81.

Figure 14B:
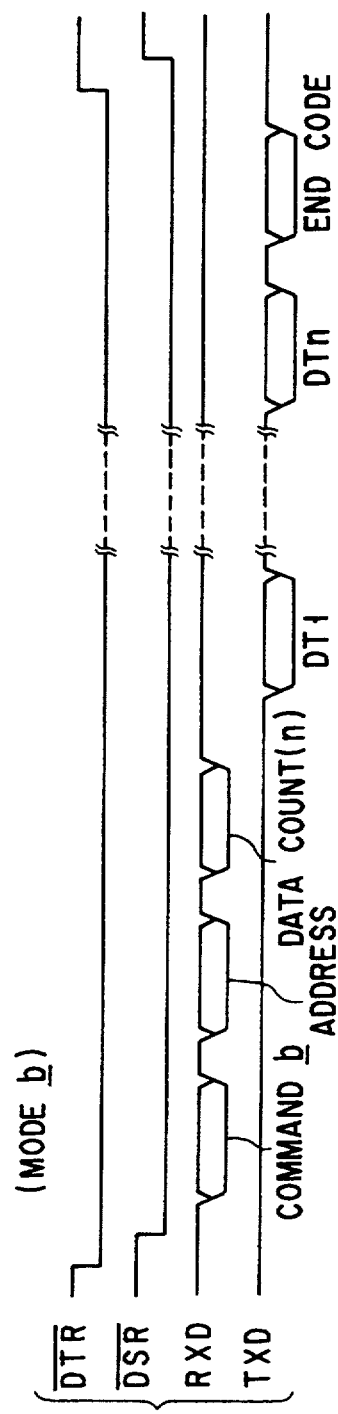

FIG. 14B is a timing chart in a mode b. In the mode b, the PC 81 reads out data from the data backup memory 103. Following the command b, the PC 81 outputs address data of the data backup memory 103 and data count (n) data indicating the number of data to be read out.

The M-μCOM 11 reads out n data (DT1 to DTn) from the memory 103 with reference to the address data, and outputs the data from the port TXD. Upon completion of transfer of the n data, the M-μCOM 11 outputs an end code to the PC 81.

Figure 14C:
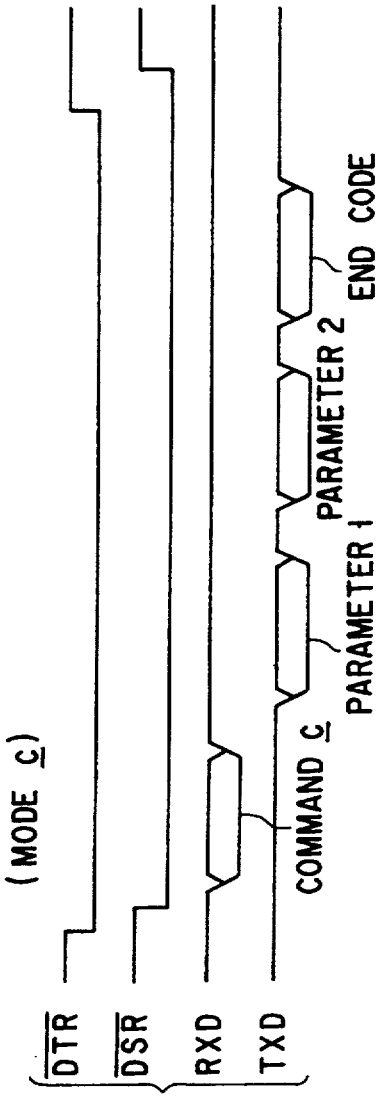

FIG. 14C is a timing chart in a mode c. Upon reception of the command c from the PC 81, the M-μCOM 11 outputs two parameters. The two parameters indicate the maximum recording density and the maximum amount of data which can be recorded on one frame. Data used for communication between the PC 81 and the M-μCOM 11 are formed on the basis of the ASCII code table shown in FIG. 15.

Figure 16:
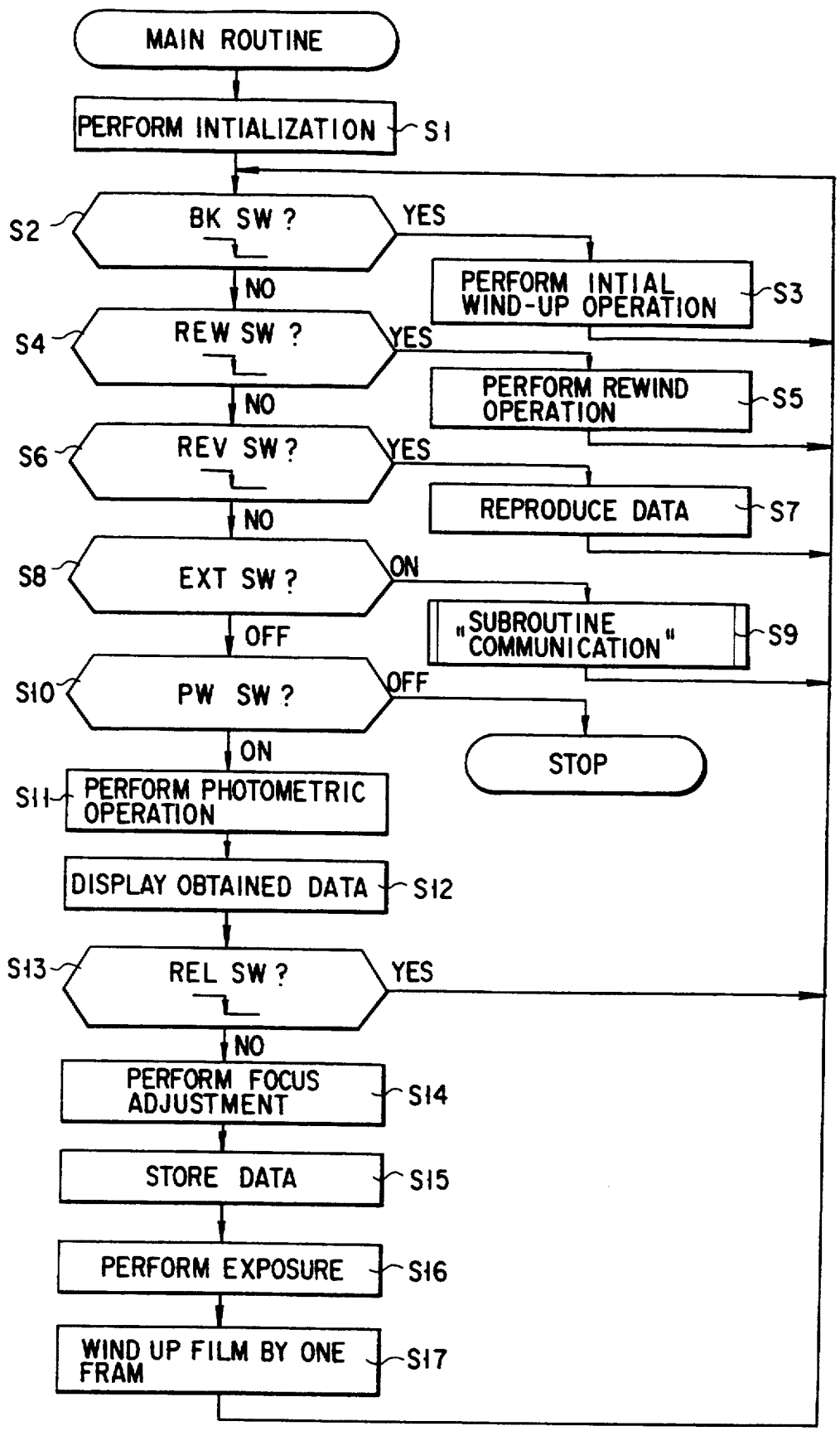
FIG. 16 is a flow chart showing a main routine of the M-μCOM in the embodiment.
Figure 17A:
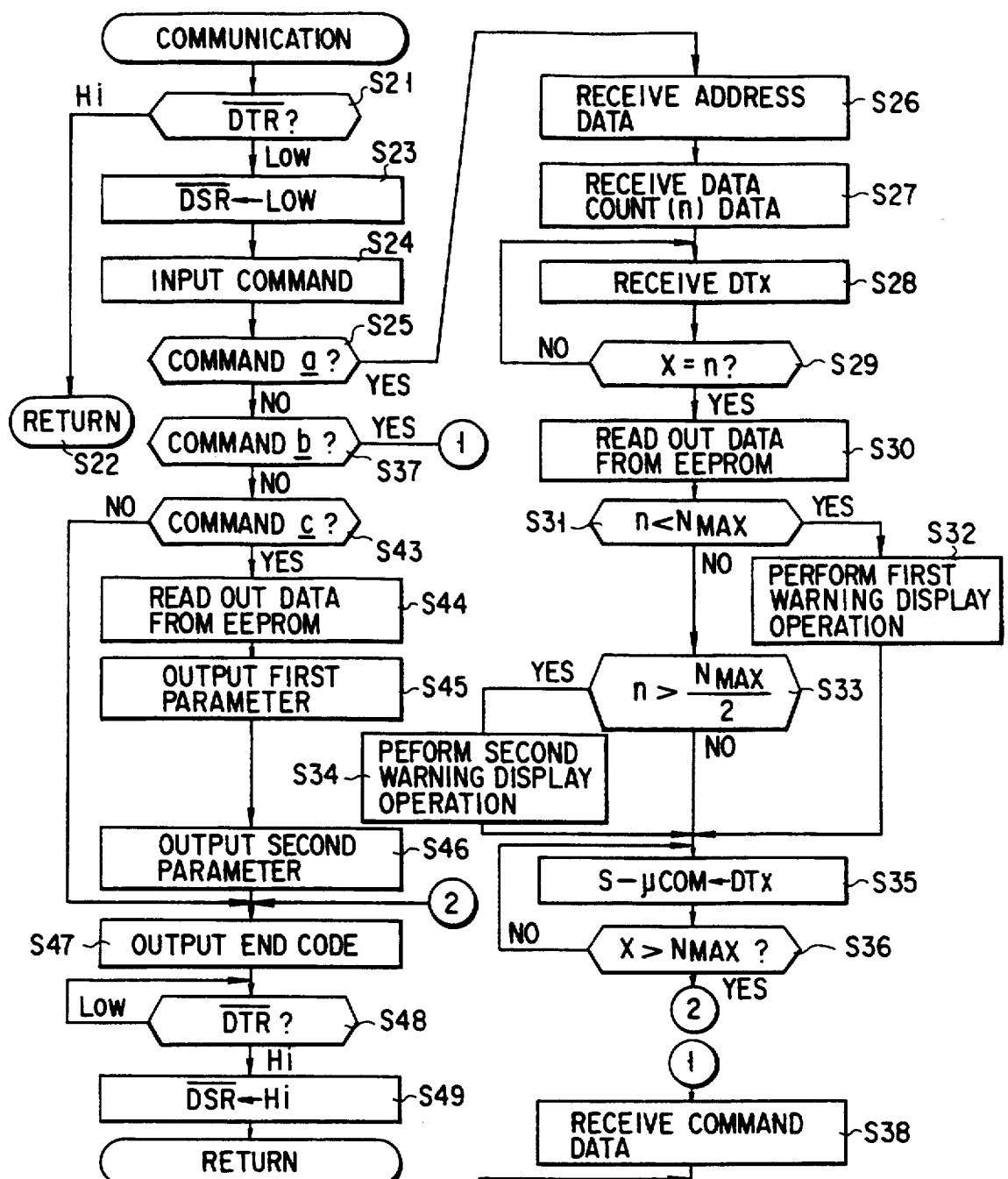
FIGS. 17A and 17B are flow charts showing a subroutine "communication" in FIG. 16.
Figure 17B:
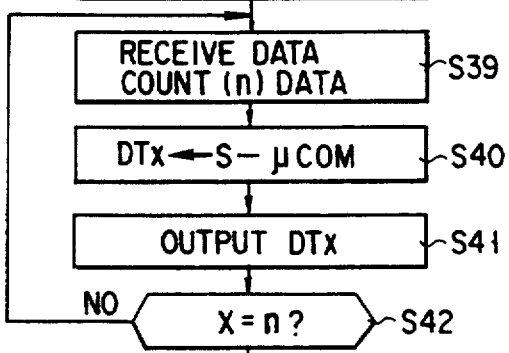

Operations of the M-μCOM 11 and the S-μCOM 101 will be described next with reference to the flow charts shown in FIG. 16 and FIGS. 17A and 17B. The same reference numerals in the following description denote the same parts as in FIGS. 1, 2, 6, and the like. The flow chart in FIG. 16 indicates a main routine. When the PWSW 31 shown in FIG. 1 is turned on, the M-μCOM 11 is subjected to power ON reset (initialized). First, the initialization memory of the I/O port is initialized (step S1).

The state of the BKSW 27 is then checked (step S2). If it is determined that the BKSW 27 has changed from an OFF state to an ON state (YES), it means that the film 23 is loaded, and the rear cover of the camera main body has changed from an open state to a closed state. Therefore, the M-μCOM 11 drives the motor (M2) 42 through the driving circuit 22 to feed the film 23 from the film cartridge 54, and also drives the motor (M1) 41 to wind the film 23 around the take-up spool 47a by a predetermined amount (step S3). The flow then returns to step S2.

If it is determined in step S2 that there is no change in the state of the BKSW 27 (NO), the state of the REWSW 25 is checked (step S4). If it is determined that the REWSW 25 is operated (YES), the M-μCOM 11 outputs a command for rewinding the film 23, for which photography is completed, into the film cartridge 54 (step S5). In synchronism with this rewiring operation, the S-μCOM 101 outputs a command for recording the data, stored in the data backup memory 103, on the magnetic track 23a of the film 23. If, however, it is determined in step S4 that there is no change in the state of the REWSW 25 (NO), the state of the REVSW 30 is checked (step S6).

If it is determined that the REVSW 30 is ON (YES), the M-μCOM 11 outputs a command for winding up the entire film 23. In synchronism with this rewind operation, the S-μCOM 101 outputs a command for reproducing the data recorded on the magnetic recording medium of the film 23 (step S7). The data reproduced in response to this command is stored in the data backup memory 103. If, however, it is determined in step S6 that there is no change in the state of the REVSW 30 (NO), the state of the EXTSW 29 is checked (step S8).

If it is determined that the EXTSW 29 is ON (YES), a subroutine "communication" (to be described later) is executed (step S9). If it is determined that the EXTSW 29 is OFF, the state of the PWSW 31 is checked (step S10).

if it is determined that the PWSW 31 is OFF, the M-μCOM 11 StOpS the operation. If it is determined that the PWSW 31 is ON, the M-μCOM 11 calculates a shutter speed and an F-number on the basis of the input data (step S11). The calculated data are displayed by the display circuit 16 (step S12).

Subsequently, the state of the RELSW 28 is checked (step S13). If it is determined that there is no change in the state of the RELSW 28 (YES), the flow returns to step S2. If, however, it is determined that the RELSW 28 is operated (NO), the M-μCOM 11 drives/controls the focus adjusting mechanism 15 on the basis of data from the distance measuring circuit 13 (step S14).

The M-μCOM 11 then forms data to be recorded on the magnetic recording medium (magnetic track) 23a of the film 23, and transfers the data to the S-μCOM 101. The S-μCOM 101 stores the data in a predetermined area of the data backup memory 103 (step S15). The M-μCOM 11 drives/controls the shutter control mechanism 14 to expose the film 23 (step S16). After the photographic operation, the M-μCOM 11 outputs a command for winding up the film 23 by one frame (step S17), and the flow returns to step S2.

The subroutine "communication" will be described next with reference to the flow chart in FIGS. 17A and 17B.

The state of the signal $\overline{DTR}$ is checked first (step S21). If it is determined that the signal is at high level (Hi), it means that the PC 81 has not opened the communication lines. Hence, the flow returns to the main routine (step S22). If it is determined that the signal is at low level (Low), the M-μCOM 11 changes the signal DSR from Hi to Low (step S23). Upon detection of a change in the signal $\overline{DSR}$, the PC 81 outputs predetermined command data. The M-μCOM 11 on the camera side receives this command data (step S24).

The M-μCOM 11 then checks on the basis of the received command data whether the current communication mode is the mode (step S25). If it is determined that the mode is set (YES), the M-μCOM 11 receives address data from the PC 81 (step S26).

Subsequently, the M-μCOM 11 receives data count (n) data from the PC 81 (step S27), and further receives n data DTx from the PC 81 (steps S28 and S29).

Upon reception of all the n data DT$_x$, the M-μCOM 11 reads out data indicating a capacity N$_{MAX}$ from the storage circuit (EEPROM) 17 (step S30). In this case, the capacity N$_{MAX}$ indicates the maximum amount of data which can be stored in one frame of a film.

Figure 18:
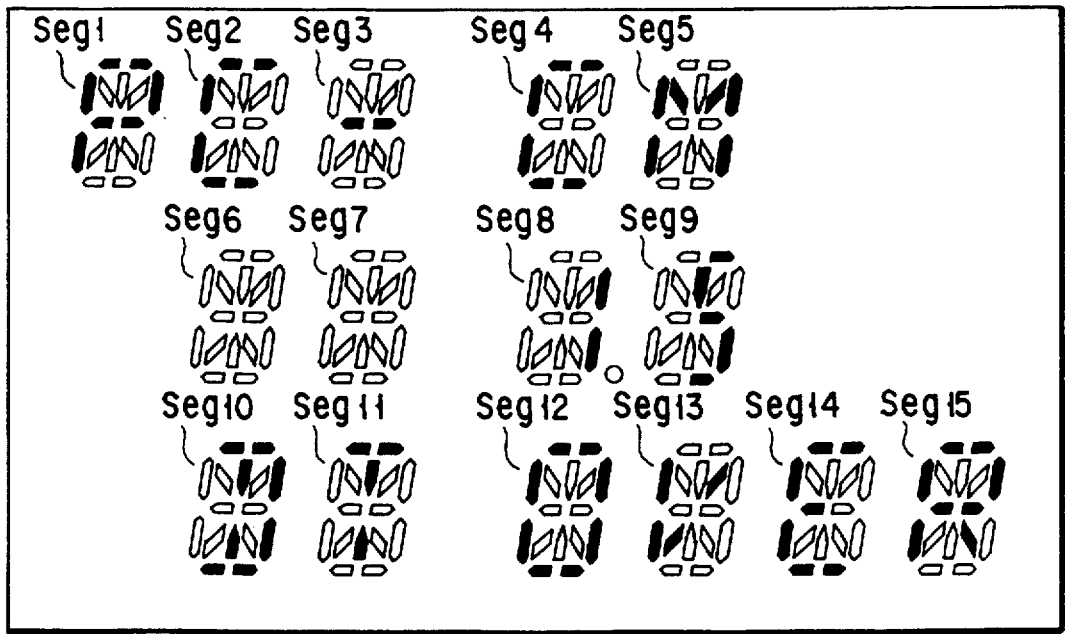
FIG. 18 is a view showing an example of a warning displayed by the display circuit.

As described above, the capacity N$_{MAX}$ can be obtained from the positional precision of the film 23 with respect to the magnetic head 34. The M-μCOM 11 checks whether the data count (n) is larger than the capacity N$MA_X$ (step S31). If it is determined that the data count (n) is larger than the capacity N$_{MAX}$ (YES), the M-μCOM 11 displays a warning such as the one shown in FIG. 18 on the display panel 16a of the display circuit 16. In this case, "15" displayed by the display segments Seg8 and Seg9 and "DT OVER" displayed by the display segments Seg10 to Seg15 indicate that the data count (n) exceeds the capacity N$_{MAX}$ by 15 bytes. This excessive data is not recorded on the film. Note that "PC—CM" displayed by the display segments Seg1 to Seg5 indicates that communication with the PC is being performed.

Figure 19:
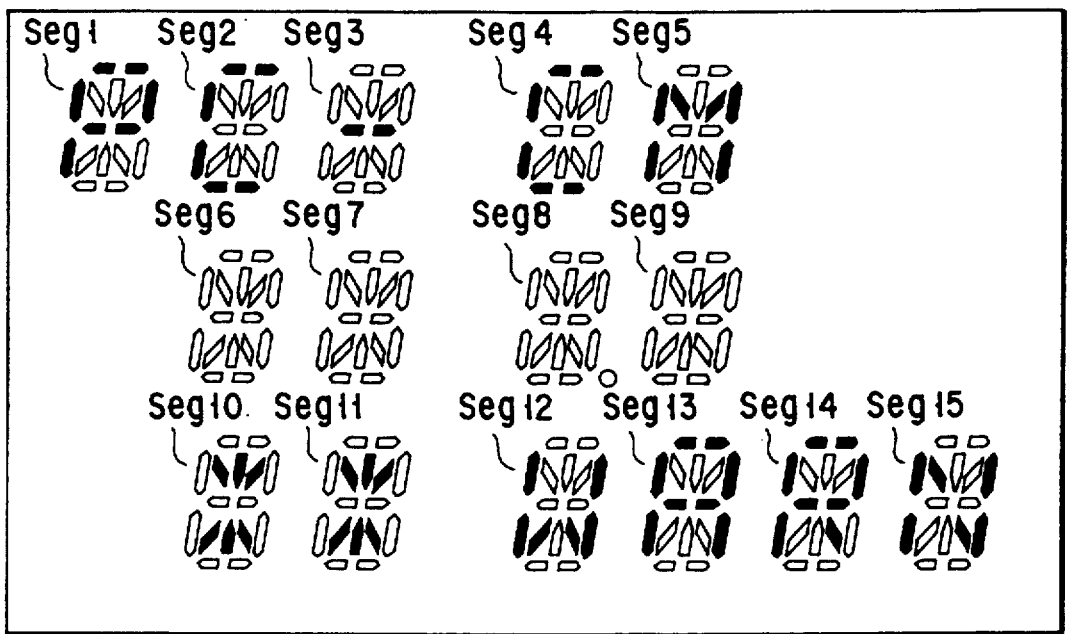
FIG. 19 is a view showing an example of a warning displayed by the display circuit.

If, however, it is determined in step S31 that the data count (n) is smaller than the capacity N$_{MAX}$ (NO), the M-μCOM 11 checks whether the data count (n) is smaller than N$_{MAX}$/2 (step S33). If it is determined that the data cont (n) is larger than N$_{MAX}$/2 (YES), the M-μCOM 11 displays a warning, e.g., "WARN" displayed by the display segments Seg12 to Seg15 in FIG. 19, on the display panel 16a (step S34). In this case, N$_{MAX}$ indicates the maximum amount of data which can be recorded when data reproduction is not performed by the same camera. If data reproduction needs to be performed by the same camera, the data count must be set to be N$_{MAX}$/2 or less. The warning shown in FIG. 19 and displayed by the display panel 16a warns that the data can be recorded but cannot be reproduced by the same camera.

The M-μCOM 11 transfers the data transmitted from the PC 81 to the S-μCOM 101 (step S35). The S-μCOM 101 stores the received data in the data backup memory 103. The M-μCOM 11 does not transfer data determined as excessive data upon comparison with the capacity N$_{MAX}$ to the S-μCOM 101 (step S36). The data which is not transferred to the S-μCOM 101 is deleted and hence is not recorded on the magnetic track 23a of the film 23.

When the data transfer operation is completed, the M-μCOM 11 outputs an end code to the PC 81 (step S49), and waits until the PC 81 closes the communication lines in response to this end code (step S48). When the signal DTR changes from Low to Hi, the M-μCOM 11 changes the signal DSR from Low to Hi (step S49) to terminate the communicating operation.

If it is determined in step S25 that the current communication mode is not the mode (command ) (NO), the M-μCOM 11 checks whether the a mode (command a) is set (step S37). If it is determined that the mode b is set (YES), the M-μCOM 11 receives address data from the PC 81 (step S38) and subsequently receives data count (n) data (step S39).

The M-μCOM 11 reads out data from the data backup memory 103 in accordance with the received address and data count (n) data, and outputs the read data to the PC 81. When the data transfer operation is completed (steps S40 to S42), the flow advances to step S47 to perform the above-described operation, thus terminating the communicating operation.

If it is determined in step S37 that the current communication mode is not the mode b (command b) (NO), the M-μCOM 11 checks whether the current communication mode is the mode c (command c) (step S47). If it is determined that the mode c is set (YES), the M-μCOM 11 reads out two parameters from the storage circuit (EEPROM) 17. These parameters are output to the PC 81 (steps S45 and S46). One of the parameters indicates the recording density of data, while the other parameter indicates the above-mentioned capacity N$_{MAX}$. The capacity N$_{MAX}$ is smaller than the recording density x the length of one frame of a film. This is because a plurality of data cannot be recorded on a magnetic recording medium without any gap, considering ease in data reproduction. when the output of the two parameters is completed, the flow advances to step S47 to perform the above-described operation, thus terminating the communicating operation.

As described above, in the magnetic recording apparatus for the camera of the embodiment, the film guides having proper dimensions are arranged at positions where the relative positions of a film and the head can be set with required precision with respect to a desired recording capacity. With this arrangement, data can be reliably recorded/reproduced.

The present invention is not limited to the above-described embodiment, and various changes and modification can be made without departing from the spirit and scope of the invention.

As has been described in detail above, according to the present invention, there is provided a magnetic recording apparatus for a camera, in which the relative positions of a film and the head can be set with required precision with respect to a desired recording capacity.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A camera using a film with a magnetic recording portion, comprising:
   two film guide members for restricting displacement of the film in a direction perpendicular to a moving direction of the film; a magnetic head for magnetizing the magnetic recording portion of the film; and
   means for outputting a magnetic recording current to said magnetic head at a predetermined magnetic recording density D$_{FM}$ according to a recording scheme based on an FM modulation scheme, the magnetic recording density D$_{FM}$ satisfying $$DFM \leq 0.12 \cdot L/(\Delta \cdot W)$$

where L is a length of each of said film guides, Δ is a difference between a width of the film and a distance between said two guide members, and W is a width of a recording medium of the magnetic recording portion.

2. A camera using a film with a magnetic recording portion, comprising:
   two film guide members for restricting displacement of the film in a direction perpendicular to a moving direction of the film;
   a magnetic head for magnetizing the magnetic recording portion of the film; and
   means for outputting a magnetic recording current to said magnetic head at a predetermined magnetic recording density D$_{TRI}$ according to a recording scheme based on a TRI-BIT scheme, the magnetic recording density D$_{TRI}$ satisfying where L is a length of each of said film guides, Δ is a difference between a width of the film and a distance between said two guide members, and W is a width of a recording medium of the magnetic recording portion.

3. A camera using a film with a magnetic recording portion, comprising:

two film guide members for restricting displacement of the film in a direction perpendicular to a moving direction of the film;

a magnetic head for magnetizing the magnetic recording portion of the film; and means for outputting a magnetic recording current to said magnetic head at a predetermined magnetic recording density [D]DNRZ1 according to a recording scheme based on a NRZ1 scheme, the magnetic recording density DNRZ1 satisfying $$D_{NRZ1} \leq 0.24 \cdot L/(\Delta \cdot W)$$

where L is a length of each of said film guides, $\Delta$ is a difference between a width of the film and a distance between said two guide members, and W is a width of a recording medium of the magnetic recording portion.

4. A camera capable of loading a film having a magnetic recording medium formed in a longitudinal direction thereof, said camera comprising:

a feed mechanism for feeding the film;

an opening portion through which the film is exposed;

a pair of film guide members, respectively arranged above and below said opening portion, for restricting widthwise movement of the film; and a magnetic information control circuit for recording information on the magnetic recording medium at a recording density D during a film feed operation of said feed mechanism, the recording density D being determined in consideration of a width W1 of the film, a distance W2 between said pair of film guide members, a length L of each of said film guide members, a track width W of the magnetic recording medium, and a constant K determined based on a magnetic recording scheme used for the magnetic recording operation, and reproduction characteristics required when the magnetically recorded information is to be reproduced, and the recording density D being represented by $$D \leq K \cdot L/\{(W2 - W1) \cdot W\}$$

5. A camera according to claim 4, wherein said magnetic information control circuit comprises a control microcomputer, a magnetic head for magnetizing the magnetic recording medium, and an interface circuit for connecting said control microcomputer to said magnetic head.

6. A camera according to claim 4, wherein the magnetic recording scheme executed by said magnetic information control circuit is an FM modulation scheme in which a magnetization polarity of the magnetic recording medium is inverted at a boundary of each bit of binary data representing the information, and a magnetic polarity is inverted or maintained at a middle point between boundaries of each bit, thereby discriminating logical values "1" and "0" from each other.

7. A camera according to claim 4, wherein the magnetic recording scheme executed by said magnetic information control circuit is an FM modulation scheme, and the constant K used in the scheme is defined by $$K = 0.12$$

provided that reproduction is performed up to a fifth order of a recording wavelength within a range of an azimuth loss of 6 dB.

8. A camera according to claim 4, wherein the magnetic recording scheme executed by said magnetic information control circuit is a TRI-BIT scheme in which a magnetization polarity of the magnetic recording medium is inverted at a boundary of each bit of binary data representing the information, and a magnetic polarity is inverted in a first or second half portion of an interval between boundaries of each bit, thereby discriminating logical values "1" and "0" from each other.

9. A camera according to claim 4, wherein the magnetic recording scheme executed by said magnetic information control circuit is a TRI-BIT scheme, and the constant K used in the scheme is defined by $$K = 0.08$$

provided that reproduction is performed up to a fifth order of a recording wavelength within a range of an azimuth loss of 6 dB.

10. A camera according to claim 4, wherein the magnetic recording scheme executed by said magnetic information control circuit is an NRZ1 scheme in which a magnetization polarity of the magnetic recording medium is inverted with respect to only bit data representing a logical value "1".

11. A camera according to claim 4, wherein the magnetic recording scheme executed by said magnetic information control circuit is an NRZ1 scheme, and the constant K used in the scheme is defined by $$K = 0.24$$

provided that reproduction is performed up to a fifth order of a recording wavelength within a range of an azimuth loss of 6 dB.

12. A camera according to claim 4, further comprising an input circuit for inputting data to be recorded on the magnetic recording medium from the outside of said camera.

13. A camera according to claim 12, further comprising a display circuit for display a warning when an amount of data input from said input circuit exceeds a recording capacity determined by the recording density.

14. A camera capable of loading a film having a magnetic recording medium formed in a longitudinal direction thereof, said camera comprising:

magnetic recording means for recording information on a predetermined track on the magnetic recording medium at a predetermined recording density while the film travels, said magnetic recording means including a magnetic head which is brought into contact with the magnetic track, and a control circuit for said magnetic head; and restricting means for restricting widthwise movement of the film during traveling of the film so as to perform recording at the predetermined recording density, said restricting means including two film guide portions arranged along a traveling path of the film, a longitudinal size L of each of said film guide portions and a distance W2 between said two film guide portions being determined to satisfy $$K \cdot L/\{(W2 - W1) \cdot W\} \geq D$$

where D is the recording density, W1 is a width of the film, and W is a width of the magnetic track, and the value K being a constant determined by a magnetic recording scheme used for the magnetic recording operation and reproduction characteristics required for reproduction of the magnetically recorded information.

15. A camera according to claim 14, wherein the magnetic recording scheme executed by said magnetic information control circuit is an FM modulation scheme in which a magnetization polarity of the magnetic recording medium is inverted at a boundary of each bit of binary data representing the information, and a magnetic polarity is inverted or maintained at a middle point between boundaries of each bit, thereby discriminating logical values "1" and "0" from each other.

16. A camera according to claim 14, wherein the magnetic recording scheme executed by said magnetic information control circuit is a TRI-BIT scheme in which a magnetization polarity of the magnetic recording medium is inverted at a boundary of each bit of binary data representing the information, and a magnetic polarity is inverted in a first or second half portion of an interval between boundaries of each bit, thereby discriminating logical values "1" and "0" from each other.

17. A camera according to claim 14, wherein the magnetic recording scheme executed by said magnetic information control circuit is an NRZ1 scheme in which a magnetization polarity of the magnetic recording medium is inverted with respect to only bit data representing a logical value "1".

18. A camera capable of loading a film having a magnetic recording medium formed in a longitudinal direction, said camera comprising:
film guide means for restricting widthwise displacement of the film; and
magnetic recording means, including a magnetic head which is brought into contact with the magnetic recording medium, for recording binary data on the magnetic recording medium through said magnetic head by a predetermined recording scheme, wherein a margin $\Delta$ of a width of said guide means with respect to a width of the film, a length L of said film guide means along which the film travels, a width W of the magnetic recording medium, and a recording density D at which the binary data is to be recorded satisfy $$D \leq K \cdot L / (\Delta \cdot W)$$

where K is a constant determined in consideration of the recording scheme and reproduction characteristics required for reproduction of the magnetically recorded information.

19. A camera according to claim 18, wherein the magnetic recording scheme executed by said magnetic information control circuit is an FM modulation scheme in which a magnetization polarity of the magnetic recording medium is inverted at a boundary of each bit of binary data representing the information, and a magnetic polarity is inverted or maintained at a middle point between boundaries of each bit, thereby discriminating logical values "1" and "0" from each other.

20. A camera according to claim 18, wherein the magnetic recording scheme executed by said magnetic information control circuit is a TRI-BIT scheme in which a magnetization polarity of the magnetic recording medium is inverted at a boundary of each bit of binary data representing the information, and a magnetic polarity is inverted in a first or second half portion of an interval between boundaries of each bit, thereby discriminating logical values "1" and "0" from each other.

21. A camera according to claim 18, wherein the magnetic recording scheme executed by said magnetic information control circuit is an NRZ1 scheme in which a magnetization polarity of the magnetic recording medium is inverted with respect to only bit data representing a logical value "1".

22. A camera capable of loading a film having a magnetic recording medium formed in a longitudinal direction, said camera comprising:
magnetizing means for magnetizing a magnetic track on the magnetic recording medium at predetermined inversion intervals, said magnetizing means including a magnetic head which is brought into contact with the magnetic track, and a control circuit for said magnetic head; and
film guide means, arranged along a traveling path of the film, for restricting a positional relationship between the magnetic track and said magnetic head to allow magnetization of the magnetic track at the predetermined magnetization inversion intervals, wherein a tilt angle $\theta$ of said magnetic head with respect to the magnetic track is set to satisfy where is the magnetization inversion interval, W is a width of the magnetic track, and k is a constant.

23. An apparatus capable of loading a film having a magnetic recording medium formed in a longitudinal direction, said apparatus comprising:
film guide means for restricting widthwise displacement of the film; and
magnetizing means, including a magnetic head which is brought into contact with the magnetic recording medium, for magnetizing the magnetic recording medium through said magnetic head at desired minimum magnetizing inversion intervals, wherein the desired minimum magnetizing inversion interval a is set to satisfy $$\underline{a} = K \cdot (\Delta \cdot W) / L$$

where $\Delta$ is a margin of a width of said guide means with respect to a width of the film, L is a length of said film guide means along which the film travels, W is a width of the magnetic recording medium, and K is a constant.

* * * * *